(12) United States Patent
Tzikas et al.

(10) Patent No.: US 7,122,667 B2
(45) Date of Patent: Oct. 17, 2006

(54) FIBRE-REACTIVE DYES, THEIR PREPARATION AND THEIR USE

(75) Inventors: Athanassios Tzikas, Pratteln (CH); Bernhard Müller, Efringen-Kirchen (DE)

(73) Assignee: Ciba Specialty Chemicals Corporation, Tarrytown, NY (US)

(*) Notice: Subject to any disclaimer, the term of this patent is extended or adjusted under 35 U.S.C. 154(b) by 46 days.

(21) Appl. No.: 10/494,393

(22) PCT Filed: Oct. 29, 2002

(86) PCT No.: PCT/EP02/12082

§ 371 (c)(1), (2), (4) Date: May 3, 2004

(87) PCT Pub. No.: WO03/040239

PCT Pub. Date: May 15, 2003

(65) Prior Publication Data
US 2004/0261199 A1 Dec. 30, 2004

(30) Foreign Application Priority Data
Nov. 7, 2001 (EP) .................. 01811073

(51) Int. Cl.
- *C07D 251/70* (2006.01)
- *C09B 44/18* (2006.01)
- *C09B 62/08* (2006.01)
- *C09B 62/16* (2006.01)
- *C09B 62/24* (2006.01)
- *C09B 62/32* (2006.01)

(52) U.S. Cl. ............... 544/199; 544/206; 534/612; 534/637; 534/638

(58) Field of Classification Search ........... 544/206, 544/199; 534/612, 637, 638, 617
See application file for complete search history.

(56) References Cited

U.S. PATENT DOCUMENTS

| | | | |
|---|---|---|---|
| 4,841,049 A | 6/1989 | Seitz | 544/76 |
| 4,897,469 A | 1/1990 | Eilingsfeld et al. | 534/605 |
| 5,003,053 A | 3/1991 | Springer et al. | 534/638 |
| 5,424,405 A | 6/1995 | Adam et al. | 534/642 |
| 5,484,899 A | 1/1996 | Deitz et al. | 534/618 |
| 5,514,782 A * | 5/1996 | Dannheim | 534/638 |
| 5,817,779 A * | 10/1998 | Deitz et al. | 534/637 |
| 6,222,067 B1 | 4/2001 | Chen et al. | 562/55 |
| 6,329,514 B1 * | 12/2001 | Huang et al. | 534/612 |

FOREIGN PATENT DOCUMENTS

| DE | 19619239 | 11/1997 |
|---|---|---|
| EP | 0197418 | 10/1986 |
| EP | 0279351 | 8/1988 |

OTHER PUBLICATIONS

Derwent Abstr. 98-000648/01 (1997) for DE 19619239.
Derwent Abstr. 86-273362/42 (1986) for EP 0197418.
The Chemistry of Synthetic Dyes, vol. VI, Reactive Dyes, Ed. K. Venkataraman, Academic Press New York and London, 1972, pp. 33-51.

* cited by examiner

Primary Examiner—Venkataraman Balasubramanian
(74) Attorney, Agent, or Firm—Kevin T. Mansfield; Shiela A. Loggins

(57) ABSTRACT

Reactive dyes of formula (1) wherein $Q_1$, $Q_2$, $Q_3$ and $Q_4$ are each independently of the others hydrogen or unsubstituted or substituted $C_1$–$C_4$alkyl, A is the radical of a monoazo, polyazo, metal complex azo, anthraquinone, phthalocyanine, formazan or dioxazine chromophore, D is the radical of a diazo component, of the benzene or naphthalene series, X is halogen, 3-carboxpyridin-1-yl, 3-carbamoylpyridin-1-yl, hydroxy, $C_1$–$C_4$alkoxy unsubstituted or substituted in the alkyl moiety, phenoxy unsubstituted or substituted in the phenyl moiety, $C_1$–$C_4$alkylthio unsubstituted or substituted in the alkyl moiety, unsubstituted or substituted amino, or an N-heterocycle which may or may not contain further hetero atoms, and Y is vinyl or a radical —$CH_2$—$CH_2$—U and U is a group removable under alkaline conditions, are suitable for dyeing cellulosic or amide-group-containing fibre materials.

13 Claims, No Drawings

FIBRE-REACTIVE DYES, THEIR PREPARATION AND THEIR USE

The present invention relates to fibre-reactive dyes, to processes for the preparation thereof and to the use thereof in dyeing or printing textile fibre materials.

The practice of dyeing using reactive dyes has recently led to higher demands being made of the quality of the dyeings and the profitability of the dyeing process. As a result, there is still a need for novel reactive dyes having improved properties, especially in respect of their application.

Dyeing nowadays requires reactive dyes that have sufficient substantivity and at the same time have good ease of washing off of unfixed dye. They should also have a good tinctorial yield and high reactivity, the objective being to provide especially dyeings having high degrees of fixing. The known dyes do not satisfy these requirements in all properties.

The problem underlying the present invention is accordingly to find, for the dyeing and printing of fibre materials, novel improved reactive dyes having the qualities characterised above to a high degree. The novel dyes should especially be distinguished by high fixing yields and high fibre-dye binding stability; it should also be possible for dye that is not fixed to the fibre to be washed off easily. The dyes should also yield dyeings having good all-round fastness properties, for example light-fastness and wet-fastness properties.

It has been shown that the problem posed is largely solved by the novel dyes defined below.

The present invention accordingly relates to reactive dyes of formula (1)

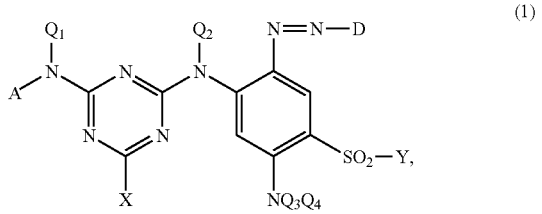

(1)

wherein $Q_1$, $Q_2$, $Q_3$ and $Q_4$ are each independently of the others hydrogen or unsubstituted or substituted $C_1$–$C_4$alkyl, A is the radical of a monoazo, polyazo, metal complex azo, anthraquinone, phthalocyanine, formazan or dioxazine chromophore, D is the radical of a diazo component, of the benzene or naphthalene series, X is halogen, 3carboxypyridin-1-yl, 3-Carbamoylpyridin-1-yl, hydroxy, $C_1$–$C_4$alkoxy unsubstituted or substituted in the alkyl moiety, phenoxy unsubstituted or substituted in the phenyl moiety, $C_1$–$C_4$alkylthio unsubstituted or substituted in the alkyl moiety, unsubstituted or substituted amino, or an N-heterocycle which may or may not contain further hetero atoms, and Y is vinyl or a radical —$CH_2$—$CH_2$-U and U is a group removable under alkaline conditions.

The radicals $Q_1$, $Q_2$, $Q_3$ and $Q_4$ as alkyl radicals are straight-chained or branched. The alkyl radicals may be further substituted, for example by hydroxy, sulfo, sulfato, cyano or by carboxy. The following radicals may be mentioned as examples: methyl, ethyl, n-propyl, isopropyl, n-butyl, isobutyl, sec-butyl and tert-butyl, and also the corresponding radicals substituted by hydroxy, sulfo, sulfato, cyano or by carboxy. Preference is given to hydroxy, sulfo, sulfato or carboxy as substituents. In the case of the alkyl radicals $Q_1$ and $Q_2$, special preference is given to hydroxy or sulfato as substituent. In the case of the alkyl radicals $Q_3$ and $Q_4$, special preference is given to carboxy as substituent.

$Q_1$, $Q_2$, $Q_3$ and $Q_4$ preferably are each independently of the others hydrogen or $C_1$–$C_4$alkyl, especially hydrogen, methyl or ethyl, the alkyl radicals being unsubstituted or substituted by hydroxy, sulfo, sulfato or by carboxy; more especially, Qis hydrogen, methyl or ethyl, $Q_2$ is hydrogen, and $Q_3$ and $Q_4$ are hydrogen or unsubstituted or carboxy-substituted methyl or ethyl.

Very especially, $Q_1$, $Q_2$, $Q_3$ and $Q_4$ are hydrogen.

X as halogen is, for example, fluorine, chlorine or bromine, and especially chlorine or fluorine.

X as $C_1$–$C_4$alkoxy is, for example, methoxy, ethoxy, n- or iso-propoxy, n-, sec-, iso- or tert-butoxy, preferably methoxy, ethoxy or isopropoxy, and especially methoxy. The mentioned radicals are unsubstituted or substituted in the alkyl moiety, for example by $C_1$–$C_4$alkoxy, hydroxy, sulfo or by carboxy. Preference is given to the unsubstituted radicals.

X as phenoxy is unsubstituted or substituted in the phenyl moiety, for example by $C_1$–$C_4$alkyl, $C_1$–$C_4$alkoxy, $C_2$–$C_4$alkanoylamino, hydroxy, sulfo or by carboxy. Preference is given to the unsubstituted or sulfo-substituted radicals.

X as $C_1$–$C_4$alkylthio is, for example, methylthio, ethylthio, n-propylthio, isopropylthio or n-butylthio, especially methylthio or ethylthio. The mentioned radicals are unsubstituted or substituted in the alkyl moiety, for example by hydroxy, carboxy or by sulfo. Preference is given to the unsubstituted radicals.

X as unsubstituted or substituted amino is amino unsubstituted or substituted at the N atom, for example one of the following radicals:

N-mono- or N,N-di-$C_1$–$C_4$alkylamino, which includes radicals that are unsubstituted, and uninterrupted or interrupted in the alkyl moiety by oxygen, and also radicals substituted in the alkyl moiety, for example by $C_2$–$C_4$alkanoylamino, $C_1$–$C_4$alkoxy, hydroxy, sulfo, sulfato, carboxy, cyano, carbamoyl or by sulfamoyl, preferably by $C_1$–$C_4$alkoxy, hydroxy, sulfo or by sulfato; preference is given to the radicals substituted in the alkyl moiety; as examples there may be mentioned N-methylamino, N-ethylamino, N-propylamino, N,N-di-methylamino or N,N-di-ethylamino, Nβ-hydroxyethylamino, N,N-di-β-hydroxyethylamino, N-2-(β-hydroxy-ethoxy)ethylamino, N-2-[2-(β-hydroxyethoxy)ethoxy]ethylamino, N-β-sulfatoethylamino, N-β-sulfoethylamino, N-carboxymethylamino, N-β-carboxyethylamino, N-α,β-dicarboxy-ethylamino, N-α,γ-dicarboxypropylamino, N-ethyl-N-β-hydroxyethylamino or N-methyl-N-β-hydroxyethylamino;

$C_5$–$C_7$cycloalkylamino, which includes both the unsubstituted radicals and the radicals substituted in the cycloalkyl ring, for example by $C_1$–$C_4$alkyl, especially methyl, or by carboxy; the corresponding cyclohexyl radicals are preferred as such radicals;

phenylamino or N—$C_1$–$C_4$alkyl-N-phenylamino, which include both the unsubstituted radicals and the radicals substituted in the phenyl ring, for example by $C_1$–$C_4$alkyl, $C_1$–$C_4$alkoxy, $C_2$–$C_4$alkanoylamino, carboxy, carbamoyl, sulfo or by halogen, or In the alkyl, for example by hydroxy, sulfo or by sulfato, such as, for example, 2-, 3- or 4-chlorophenylamino, 2-, 3- or 4-methylphenylamino, 2-, 3- or 4-methoxyphenylamino, 2-, 3- or 4-sulfophenylamino, disulfo-phenylamino, or 2-, 3- or 4-carboxyphenyl-amino; preferably, those radicals are, in the phenyl ring, unsubstituted or substituted by sulfo; naphthylamino unsubstituted or substituted in the naphthyl ring, for example by sulfo, preferably the radicals substituted by from 1 to 3 sulfo groups, such as, for example, 1- or 2-naphthylamino, 1-sulfo-2-naphthylamino, 1,5-disulfo-2-naphthylamino or 4,8-disulfo-2-naphthylamino; or benzylamino unsubstituted or substituted in the phenyl moiety, for example by $C_1$–$C_4$alkyl, $C_1$–$C_4$alkoxy, carboxy, sulfo or by halogen.

N-heterocycles which may or may not contain further hetero atoms and which are suitable as X are, for example, morpholino or piperidin-1-yl, preferably morpholino.

X is preferably fluorine, chlorine, $C_1$–$C_4$alkoxy, $C_1$–$C_4$alkylthio, hydroxy, amino; N-mono- or N,N-di-$C_1$–$C_4$alkylamino unsubstituted or substituted in the alkyl moiety by hydroxy, sulfato or by sulfo; morpholino; phenylamino or N—$C_1$–$C_4$alkyl-N-phenylamino (wherein the alkyl is unsubstituted or substituted by hydroxy, sulfo or by sulfato) unsubstituted or substituted in the phenyl ring by sulfo, carboxy, acetylamino, chlorine, methyl, ethyl, methoxy or by ethoxy; or unsubstituted or mono- to tri-sulfo-substituted naphthylamino.

X is especially fluorine, chlorine, amino, N-methylamino, N-ethylamino, N-β-hydroxyethyl-amino, N-methyl-N-β-hydroxyethylamino, N-ethyl-N-β-hydroxyethylamino, N,N-di-β-hydroxy-ethylamino, morpholino, 2-, 3- or 4-sulfophenylamino or N—$C_1$–$C_4$alkyl-N-phenylamino.

X is very especially fluorine, chlorine, amino, N-β-hydroxyethylamino, N,N-di-β-hydroxyethyl-amino, morpholino or 2-, 3- or 4-sulfophenylamino.

X in the meaning of fluorine or chlorine, especially chlorine, is very especially important.

As a group removable under alkaline conditions, U may be, for example, —Cl, —Br, —F, —OSO$_3$H, —SSO$_3$H, —OCO—CH$_3$, —OPO$_3$H$_2$, —OCO—C$_6$H$_5$, —OSO$_2$—$C_1$–$C_4$alkyl or —OSO$_2$—N($C_1$–$C_4$alkyl)$_2$. U is preferably a group of formula —Cl, —OSO$_3$H, —SSO$_3$H, —OCO—CH$_3$, —OCO—C$_6$H$_5$ or —OPO$_3$H$_2$, especially —Cl or —OSO$_3$H, and more especially —OSO$_3$H.

Examples of suitable radicals Y are accordingly vinyl, β-bromo- or β-chloro-ethyl, β-acetoxy-ethyl, β-benzoyloxy-ethyl, β-phosphatoethyl, β-sulfatoethyl and β-thiosulfatoethyl. Y is preferably vinyl, β-chloroethyl or β-sulfatoethyl, and especially vinyl or β-sulfatoethyl.

Suitable substituents of the radical D include the substituents customary for azo dyes. The following may be mentioned by way of example: $C_1$–$C_4$alkyl, which is to be understood as being methyl, ethyl, n- or iso-propyl, and n-, iso-, sec- or tert-butyl; $C_1$–$C_4$alkoxy, which is to be understood as being methoxy, ethoxy, n- or iso-propoxy, and n-, iso-, sec- or tert-butoxy; hydroxy-$C_1$–$C_4$alkoxy; phenoxy; $C_2$–$C_6$alkanoylamino unsubstituted or substituted in the alkyl moiety by hydroxy or by $C_1$–$C_4$alkoxy, e.g. acetylamino, hydroxyacetylamino, methoxyacetyl-amino or propionylamino; benzoylamino unsubstituted or substituted in the phenyl moiety by hydroxy, sulfo, halogen, $C_1$–$C_4$alkyl or by $C_1$–$C_4$alkoxy; $C_1$–$C_6$alkoxycarbonylamino unsubstituted or substituted in the alkyl moiety by hydroxy, $C_1$–$C_4$alkyl or by $C_1$–$C_4$alkoxy; phenoxycarbonylamino unsubstituted or substituted in the phenyl moiety by hydroxy, $C_1$–$C_4$alkyl or by $C_1$–$C_4$alkoxy; amino; N—$C_1$–$C_4$alkyl- or N,N-di-$C_1$–$C_4$alkyl-amino unsubstituted or substituted in the alkyl moiety by hydroxy, $C_1$–$C_4$alkoxy, carboxy, cyano, halogen, sulfo, sulfato, phenyl or by sulfophenyl, e.g. methylamino, ethylamino, N,N-dimethylamino, N,N-diethylamino, β-cyanoethylamino, β-hydroxyethylamino, N,N-di-β-hydroxyethylamino, βsulfoethylamino, γ-sulfo-n-propylamino, β-sulfatoethylamino, N-ethyl-N-(3-sulfobenzyl)-amino, N-(β-sulfoethyl)-N-benzylamino; cyclohexylamino; N-phenylamino or N—$C_1$–$C_4$alkyl-N-phenylamino unsubstituted or substituted in the phenyl moiety by nitro, $C_1$–$C_4$alkyl, $C_1$–$C_4$alkoxy, carboxy, halogen or by sulfo; $C_1$–$C_4$alkoxycarbonyl, e.g. methoxy- or ethoxy-carbonyl; trifluoromethyl; nitro; cyano; halogen, which is to be understood generally as being, for example, fluorine, bromine or, especially, chlorine; ureido; hydroxy; carboxy; sulfo; sulfomethyl; carbamoyl; carbamido; sulfamoyl; N-phenylsulfamoyl or N—$C_1$–$C_4$alkyl-N-phenylsulfamoyl unsubstituted or substituted in the phenyl moiety by sulfo or by carboxy; methyl- or ethyl-sulfonyl.

Suitable substituents of the radical D also include fibre-reactive radicals.

Fibre-reactive radicals are to be understood as being those which are capable of reacting with the hydroxy groups of cellulose, with the amino, carboxy, hydroxy and thiol groups in wool and silk or with the amino and possibly carboxy groups of synthetic polyamides to form covalent chemical bonds. The fibre-reactive radicals are generally bonded to the dye radical directly or via a bridging member. Suitable fibre-reactive radicals are, for example, those having at least one removable substituent at an aliphatic, aromatic or heterocyclic radical or those wherein the mentioned radicals contain a radical suitable for reaction with the fibre material, for example a vinyl radical.

A fibre-reactive radical present in D corresponds, for example, to formula (2a), (2b), (2c), (2d), (2e), (2f) or (2g)

—SO$_2$-Y         (2a),

—NH—CO—(CH$_2$)$_l$SO$_2$-Y     (2b),

—CONR$_2$—(CH$_2$)$_m$—SO$_2$Y     (2c),

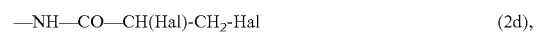
—NH—CO—CH(Hal)-CH$_2$-Hal    (2d),

—NH—CO—C(Hal)=CH$_2$     (2e),

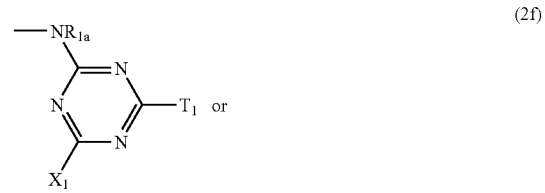

(2f)

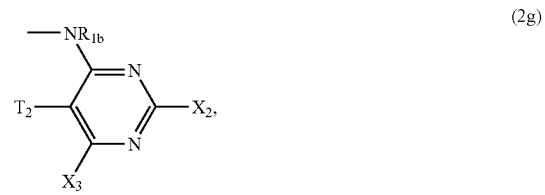

(2g)

wherein

Hal is chlorine or bromine, $X_1$ is halogen, 3-carboxypyridin-1-yl or 3-carbamoylpyridin-1-yl, $T_1$ has independently the same definitions as $X_1$, or is a non-fibre-reactive substituent or a fibre-reactive radical of formula (3a), (3b), (3c), (3d), (3e) or (3f)

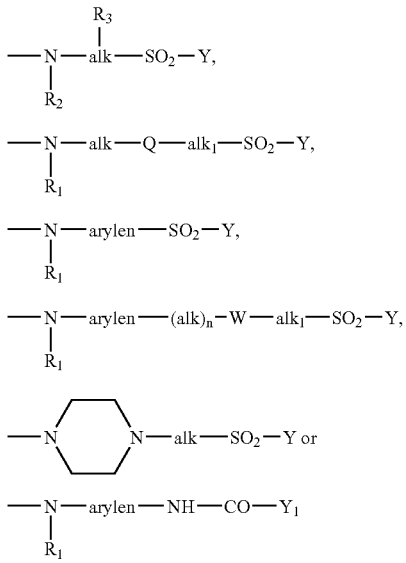

wherein
R$_1$, R$_{1a}$ and R$_{1b}$ are each independently of the others hydrogen or C$_1$–C$_4$alkyl,
R$_2$ is hydrogen; C$_1$–C$_4$alkyl unsubstituted or substituted by hydroxy, sulfo, sulfato, carboxy or by cyano; or a radical

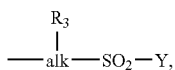

R$_3$ is hydrogen, hydroxy, sulfo, sulfato, carboxy, cyano, halogen, C$_1$–C$_4$alkoxycarbonyl,
C$_1$–C$_4$alkanoyloxy, carbamoyl or a group —SO$_2$-Y,
alk and alk$_1$ are each independently of the other linear or branched C$_1$–C$_6$alkylene, arylene is a phenylene or naphthylene radical unsubstituted or substituted by sulfo, carboxy, C$_1$–C$_4$alkyl, C$_1$–C$_4$alkoxy or by halogen,
Q is a radical —O— or —NR$_1$— wherein R$_1$ is as defined above,
W is a group —SO$_2$—NR$_2$—, CONR$_2$— or —NR$_2$CO— wherein R$_2$ is as defined above,
Y is vinyl or a radical —CH$_2$CH$_2$-U and U is a group removable under alkaline conditions,
Y$_1$ is a group —CH(Hal)-CH$_2$-Hal or —C(Hal)=CH$_2$ and Hal is chlorine or bromine, and
l and m are each independently of the other an integer from 1 to 6 and n is a number 0 or 1, and
X$_2$ is halogen or C$_1$–C$_4$alkylsulfonyl,
X$_3$ is halogen or C$_1$–C$_4$alkyl, and
T$_2$ is hydrogen, cyano or halogen.
Y is as defined above and has the preferred meanings given above.
R$_1$, R$_{1a}$ and R$_{1b}$ preferably are each independently of the others hydrogen, methyl or ethyl, and especially hydrogen.
R$_2$ is preferably hydrogen or C$_1$–C$_4$alkyl, for example methyl, ethyl, propyl, isopropyl, butyl, isobutyl, sec-butyl or tert-butyl, and especially hydrogen, methyl or ethyl. R$_2$ is more especially hydrogen.

R$_3$ is preferably hydrogen.
l and m preferably are each independently of the other a number 2, 3 or 4, and especially a number 2 or 3.
More especially, l is the number 3 and m is the number 2.
For a non-fibre-reactive substituent T$_1$ there come into consideration, for example, hydroxy or one of the radicals indicated above for X in the meaning of C$_1$–C$_4$-alkoxy unsubstituted or substituted in the alkyl moiety, phenoxy unsubstituted or substituted in the phenyl moiety, C$_1$–C$_4$alkylthio unsubstituted or substituted in the alkyl moiety, unsubstituted or substituted amino, or an N-heterocycle which may or may not contain further hetero atoms.
T$_1$ as a non-fibre-reactive radical is preferably C$_1$–C$_4$alkoxy, C$_1$–C$_4$alkylthio, hydroxy, amino; N-mono- or N,N-di-C$_1$–C$_4$alkylamino unsubstituted or substituted in the alkyl moiety by hydroxy, sulfato or by sulfo; morpholino; or phenylamino or N—C$_1$–C$_4$alkyl-N-phenylamino (wherein the alkyl is unsubstituted or substituted by hydroxy, sulfo or by sulfato) each unsubstituted or substituted in the phenyl ring by sulfo, carboxy, acetylamino, chlorine, methyl or by methoxy; or naphthylamino unsubstituted or substituted by from 1 to 3 sulfo groups.
Especially preferred non-fibre-reactive radicals T$_1$ are amino, N-methylamino, N-ethylamino, N-β-hydroxyethylamino, N-methyl-Nβ-hydroxyethylamino, N-ethyl-N-β-hydroxyethylamino, N,N-di-β-hydroxyethylamino, morpholino, 2-, 3- or 4-carboxyphenylamino, 2-, 3- or 4-sulfophenylamino or N—C$_1$–C$_4$alkyl-N-phenylamino.
X$_1$ is preferably halogen, for example fluorine, chlorine or bromine and especially chlorine or fluorine.
T$_2$, X$_2$ and X$_3$ as halogen are, for example, fluorine, chlorine or bromine, especially chlorine or fluorine.
X$_2$ as C$_1$–C$_4$alkylsulfonyl is, for example, ethylsulfonyl or methylsulfonyl and especially methylsulfonyl.
X$_3$ as C$_1$–C$_4$alkyl is, for example, methyl, ethyl, n- or iso-propyl, n-, iso- or tert-butyl and especially methyl.
X$_2$ and X$_3$ are preferably each independently of the other chlorine or fluorine.
T$_2$ is preferably cyano or chlorine.
Hal is preferably bromine.
alk and alk$_1$ are each independently of the other, for example, a methylene, ethylene, 1,3-propylene, 1,4-butylene, 1,5-pentylene or 1,6hexylene radical or a branched isomer thereof.
alk and alk$_1$ are preferably each independently of the other a C$_1$–C$_4$alkylene radical and especially an ethylene radical or propylene radical.
arylene is preferably a 1,3- or 1,4-phenylene radical unsubstituted or substituted, for example, by sulfo, methyl, methoxy or by carboxy, and especially an unsubstituted 1,3- or 1,4-phenylene radical.
Q is preferably —NH— or —O— and especially —O—.
W is preferably a group of formula —CONH— or —NHCO—, especially a group of formula —CONH—.
n is preferably the number 0.
The reactive radicals of formulae (3a) to (3f) are preferably those wherein W is a group of formula —CONH—, R$_1$, R$_2$ and R$_3$ are each hydrogen, Q is a radical —O— or NH—, alk and alk$_1$ are each independently of the other ethylene or propylene, arylene is phenylene unsubstituted or substituted by methyl, methoxy, carboxy or by sulfo, Y is vinyl or β-sulfatoethyl, Y$_1$ is —CHBr—CH$_2$Br or —CBr=CH$_2$ and n is the number 0.
A fibre-reactive radical present in D corresponds preferably to a radical of formula (2a), (2b), (2c), (2d), (2e) or (2f) wherein Y is vinyl, β-chloroethyl or β-sulfatoethyl, Hal is bromine, R$_2$ and R$_{1a}$ are hydrogen, m and l are a number 2 or 3, $X_1$ is halogen, $T_1$ is $C_1$–$C_4$alkoxy, $C_1$–$C_4$alkylthio, hydroxy, amino; N-mono- or N,N-di-$C_1$–$C_4$alkylamino unsubstituted or substituted in the alkyl moiety by hydroxy, sulfato or by sulfo; morpholino; or phenylamino or N—$C_1$–$C_4$alkyl-N-phenylamino (wherein the alkyl is unsubstituted or substituted by hydroxy, sulfo or by sulfato) each unsubstituted or substituted in the phenyl ring by sulfo, carboxy, acetylamino, chlorine, methyl or by methoxy; or naphthylamino unsubstituted or substituted by from 1 to 3 sulfo groups, or is a fibre-reactive radical of formula (3a'), (3b'), (3c'), (3d') or (3f')

—NH—(CH$_2$)$_{2-3}$—SO$_2$Y (3a'),

—NH—(CH$_2$)$_{2-3}$—O—(CH$_2$)$_{2-3}$—SO$_2$Y (3b'),

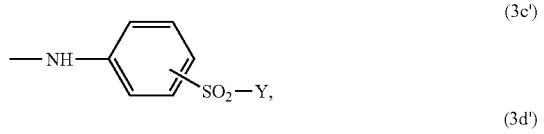
(3c')

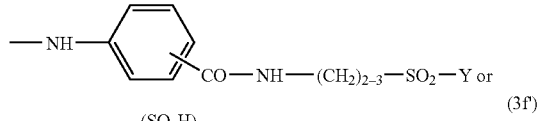
(3d')

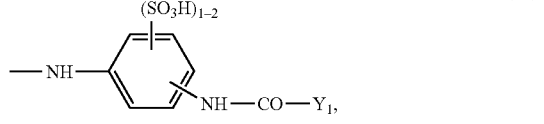
(3f')

especially (3c') or (3d'), wherein
Y is as defined above, and
$Y_1$ is a group —CH(Br)—CH$_2$—Br or —C(Br)═CH$_2$.

In the case of the radicals of formulae (3a') and (3b'), Y is preferably β-chloroethyl. In the case of the radicals of formulae (3c') and (3d'), Y is preferably vinyl or β-sulfatoethyl.

A particular embodiment of the present invention relates to dyes wherein a radical present in D corresponds to formula (2h)

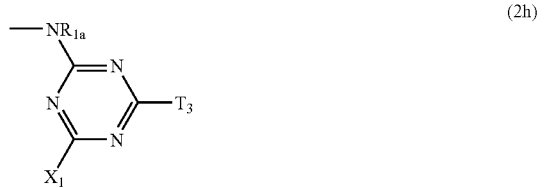
(2h)

wherein
$R_{1a}$ and $X_1$ are as defined above and have the preferred meanings given above, and
$T_3$ is a monoazoamino or disazoamino radical of formula (4) or (5)

$D_1$-N═N-(M-N═N)$_u$—$K_1$—$NR_1$— (4) or

—$NR_1$-$D_1$-N═N-(M-N═N)$_u$—$K_1$ (5)

wherein
$D_1$ is the radical of a diazo component, of the benzene or naphthalene series, M is the radical of a central component, of the benzene or naphthalene series, $K_1$ is the radical of a coupling component, of the benzene, naphthalene, pyrazolone, 6-hydroxypyrid-2-one or acetoacetic acid arylamide series, $R_1$ is as defined above and has the preferred meanings given above and u is a number 0 or 1, wherein $D_1$, M and $K_1$ may carry substituents customary for azo dyes.

The expression "substituents customary for azo dyes" is intended to include both fibre-reactive and non-fibre-reactive substituents, for example the substituents mentioned above for D.

As non-fibre-reactive substituents for $D_1$, M and $K_1$ in $T_3$ there come into consideration preferably $C_1$–$C_4$alkyl or $C_1$–$C_4$alkoxy unsubstituted or further substituted by hydroxy, sulfo or by sulfato; halogen, carboxy, sulfo, nitro, cyano, trifluoromethyl, sulfamoyl, carbamoyl, amino, ureido, hydroxy, sulfomethyl, $C_2$–$C_4$alkanoylamino; benzoylamino unsubstituted or substituted in the phenyl ring by $C_1$–$C_4$alkyl, $C_1$–$C_4$alkoxy, halogen or by sulfo; or phenyl unsubstituted or substituted by $C_1$–$C_4$alkyl, $C_1$–$C_4$alkoxy, halogen, carboxy or by sulfo.

The monoazoamino or disazoamino radicals of formula (4) or (5) preferably contain at least one sulfo group.

Preferred monoazoamino or disazoamino radicals $T_3$ are the radicals of formulae (6a), (6b), (6c), (6d), (6e), (6f), (6g), (6h), (6i), (6j), (6k), (6l), (6m), (6n), (6o) and (6p)

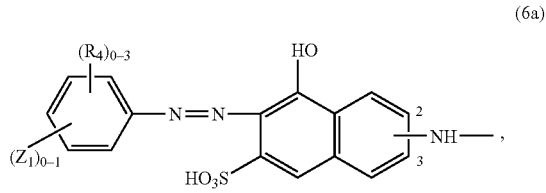
(6a)

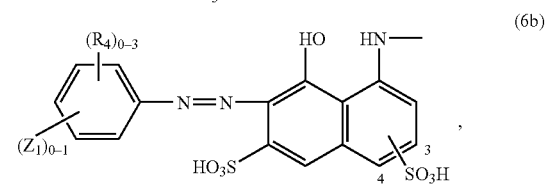
(6b)

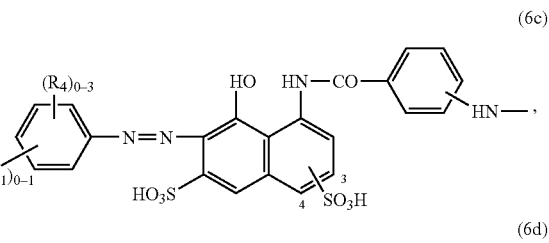
(6c)

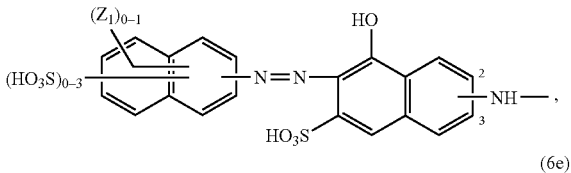
(6d)

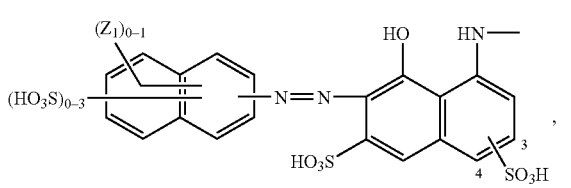
(6e)

-continued (6f)
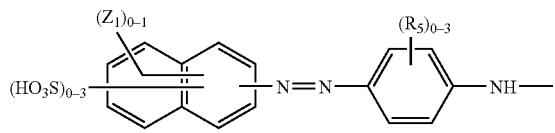

wherein $(R_4)_{0-3}$ denotes from 0 to 3 identical or different substituents from the group $C_1$–$C_4$alkyl, $C_1$–$C_4$alkoxy, halogen, carboxy and sulfo, $(R_5)_{0-3}$ denotes from 0 to 3 identical or different substituents from the group halogen, nitro, cyano, trifluoromethyl, sulfamoyl, carbamoyl, $C_1$–$C_4$alkyl; $C_1$–$C_4$alkoxy unsubstituted or substituted by hydroxy, sulfato or by $C_1$–$C_4$alkoxy; amino, $C_2$–$C_4$alkanoylamino, ureido, hydroxy, carboxy, sulfomethyl, $C_1$–$C_4$alkylsulfonylamino and sulfo, and $Z_1$ is a radical of formula (2a), (2c), (2d), (2e), (2f) or (2g), preferably (2a), (2c), (2d) or (2e) and especially (2a), the mentioned radicals having the definitions and preferred meanings given above, (6g)
(6h)
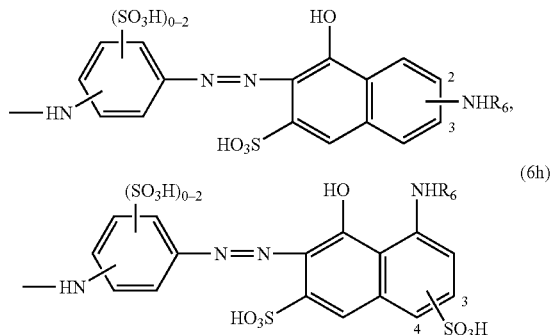

wherein $R_6$ is $C_2$–$C_4$alkanoyl, benzoyl or a radical of formula (2b) or (2f) indicated above wherein the radicals are as defined above and have the preferred meanings given above, preferably $C_2$–$C_4$alkanoyl or benzoyl, (6i)
(6j)
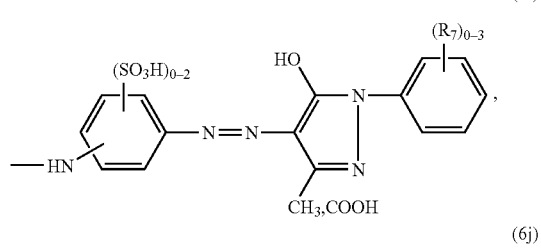

wherein $(R_7)_{0-3}$ denotes from 0 to 3 identical or different substituents from the group $C_1$–$C_4$alkyl, $C_1$–$C_4$alkoxy, halogen, carboxy and sulfo, (6k)
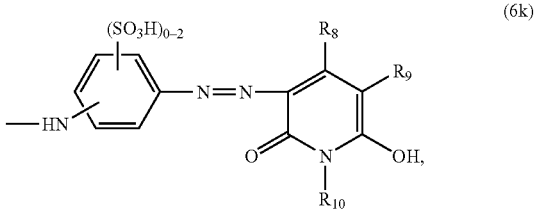

wherein $R_8$ and $R_{10}$ are each independently of the other hydrogen, $C_1$–$C_4$alkyl or phenyl, and $R_9$ is hydrogen, cyano, carbamoyl or sulfomethyl, (6l)
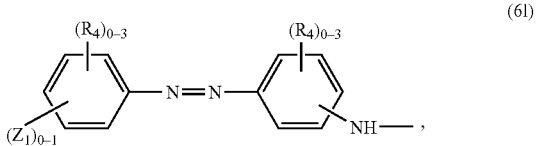

(6m)
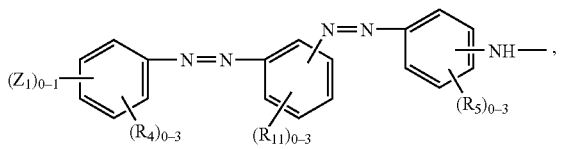

(6n)
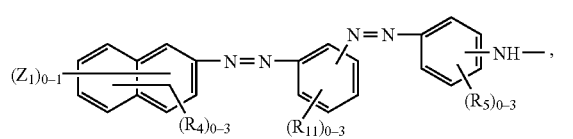

(6o)
(6p)
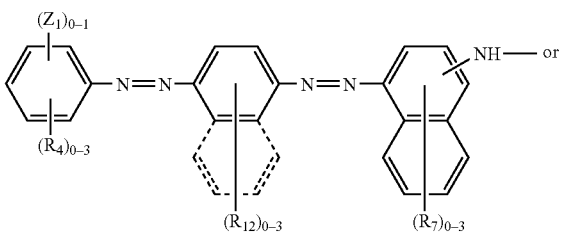

wherein
$(R_4)_{0-3}$, $(R_5)_{0-3}$ and $(R_7)_{0-3}$ are each as defined above,
$(R_{11})_{0-3}$ and $(R_{12})_{0-3}$ each independently of the other denote from 0 to 3 identical or different substituents from the group $C_1$–$C_4$alkyl, $C_1$–$C_4$alkoxy, halogen, carboxy and sulfo, and $Z_1$ is as defined above and has the preferred meanings given above.

The numbers on the naphthyl rings of the radicals of formulae (6a), (6b), (6c), (6d), (6e), (6g) and (6h) indicate the possible bonding positions.

$(R_4)_{0-3}$ in the disazoamino radicals of formulae (6n) and (6p) preferably denotes from 0 to 3 sulfo groups.

Especially preferred monoazoamino or disazoamino radicals $T_3$ are the radicals of formulae (6a), (6b), (6d), (6e), (6f), (6k) and (6m), especially (6b), (6k) and (6m).

D is, for example, phenyl or naphthyl, each of which is unsubstituted or is substituted, for example by $C_1$–$C_4$alkyl, $C_1$–$C_4$alkoxy, halogen, sulfo, nitro, carboxy or by a fibre-reactive radical of formula (2a), (2b), (2c), (2d), (2e), (2f) or (2g), especially (2a), (2c), (2d), (2e) or (2f), the mentioned fibre-reactive radicals having the definitions and preferred meanings given above.

D also includes monoazo radicals, for example those of formula (7) or (8)

$$-D_2-N=N-K_2 \quad (7)$$

or $$D_2-N=N-K_3- \quad (8),$$

preferably of formula (8), wherein $D_2$ is the radical of a diazo component, of the benzene or naphthalene series, $K_2$ is the radical of a coupling component, of the benzene, naphthalene, pyrazolone, 6-hydroxypyrid-2-one or acetoacetic acid arylamide series, and $K_3$ is the radical of a coupling component, of the benzene or naphthalene series, wherein $D_2$, $K_2$ and $K_3$ may carry substituents customary for azo dyes.

The expression "substituents customary for azo dyes" is intended to include both fibre-reactive and non-fibre-reactive substituents, for example the substituents mentioned above for D.

As non-fibre-reactive substituents for $D_2$, $K_2$ and $K_3$ there come into consideration preferably $C_1$–$C_4$alkyl or $C_1$–$C_4$alkoxy each unsubstituted or further substituted by hydroxy, $C_1$–$C_4$alkoxy, sulfo or by sulfato; halogen, carboxy, sulfo, nitro, cyano, trifluoromethyl, sulfamoyl, carbamoyl, amino, ureido, hydroxy, sulfomethyl, $C_2$–$C_4$alkanoylamino, $C_1$–$C_4$alkylsulfonyl-amino; benzoylamino unsubstituted or substituted in the phenyl ring by $C_1$–$C_4$alkyl, $C_1$–$C_4$alkoxy, halogen or by sulfo; or phenyl unsubstituted or substituted by $C_1$–$C_4$alkyl, $C_1$–$C_4$alkoxy, halogen, carboxy or by sulfo.

As fibre-reactive substituents for $D_2$, $K_2$ and $K_3$ there come into consideration preferably the radicals of formulae (2a), (2b), (2c), (2d), (2e) and (2f), especially (2a) and (2f) and more especially (2a), the mentioned radicals having the definitions and preferred meanings given above. In an interesting embodiment, preference is given to a radical of formula (2a) as fibre-reactive substituent for $D_2$ and to a radical of formula (2f) as fibre-reactive substituent for $K_8$.

The monoazo radicals of formulae (7) and (8) preferably contain at least one sulfo group.

Preferred monoazo radicals D of formula (8) correspond to the radicals of formulae (8a), (8b), (8c), (8d), (8e), (8f), (8g), (8h), (8i) and (8j)

wherein $(R_4)_{0-3}$ denotes from 0 to 3 identical or different substituents from the group $C_1$–$C_4$alkyl, $C_1$–$C_4$alkoxy, halogen, carboxy and sulfo, and $Z_1$ is a fibre-reactive radical of formula (2a), (2c), (2d), (2e), (2f) or (2g), preferably (2a), (2c), (2d) or (2e) and especially (2a), the mentioned fibre-reactive radicals having the definitions and preferred meanings given above, -continued

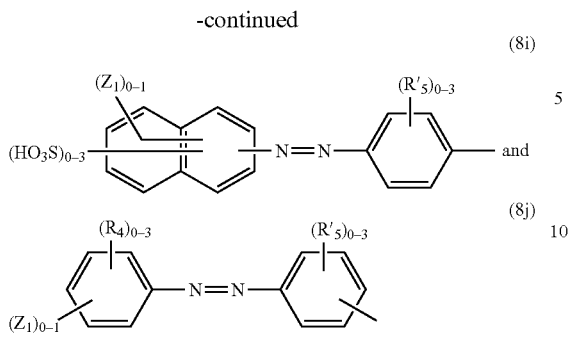

(8i)

(8j)

wherein $(R_4)_{0-3}$ is as defined above, $(R'_5)_{0-3}$ denotes from 0 to 3 identical or different substituents from the group halogen, nitro, cyano, trifluoromethyl, sulfamoyl, carbamoyl, $C_1$–$C_4$alkyl; $C_1$–$C_4$alkoxy unsubstituted or substituted by hydroxy, sulfato or by $C_1$–$C_4$alkoxy; amino, $C_2$–$C_4$alkanoylamino, ureido, hydroxy, carboxy, sulfomethyl, $C_1$–$C_4$alkylsulfonylamino, sulfo and a fibre-reactive radical of formula (2f) wherein the radicals $R_{1a}$, $T_1$ and $X_1$ are as defined above and have the preferred meanings given above and $Z_1$ is as defined above and has the preferred meanings given above.

The numbers on the naphthyl rings of the radicals of formulae (8a), (8b), (8e) and (8f) indicate the possible bonding positions.

The radical D preferably corresponds to a radical of formula (9) or (10)

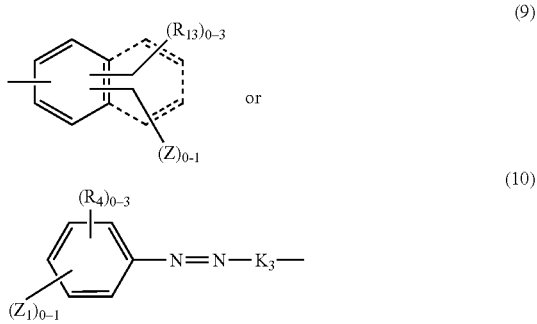

(9)

(10)

wherein $(R_4)_{0-3}$ and $(R_{13})_{0-3}$ each independently of the other denote from 0 to 3 identical or different substituents selected from the group halogen, $C_1$–$C_4$alkyl, $C_1$–$C_4$alkoxy, carboxy and sulfo, $K_3$ is the radical of a coupling component of formula (11a) or (11b)

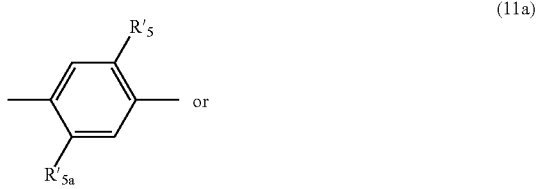

(11a)

-continued

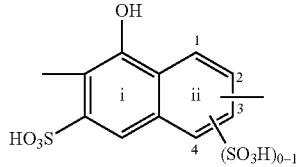

(11b)

and

Z and $Z_1$ are each independently of the other a radical of formula (2a), (2c), (2d), (2e) or (2f) indicated above, wherein $R_{1a}$ and $R_2$ are hydrogen, Hal is bromine, Y is vinyl, β-chloroethyl or β-sulfatoethyl, $T_1$ is $C_1$–$C_4$alkoxy, $C_1$–$C_4$alkylthio, hydroxy, amino; N-mono- or N,N-di-$C_1$–$C_4$alkylamino unsubstituted or substituted in the alkyl moiety by hydroxy, sulfato or by sulfo; morpholino; or phenylamino or N—$C_1$–$C_4$alkyl-N-phenylamino (wherein the alkyl is unsubstituted or substituted by hydroxy, sulfo or by sulfato) each unsubstituted or substituted in the phenyl ring by sulfo, carboxy, acetylamino, chlorine, methyl or by methoxy; or naphthylamino unsubstituted or substituted by from 1 to 3 sulfo groups, or is a fibre-reactive radical of formula (3c') or (3d') indicated above, and Y is as defined above, $X_1$ is chlorine or fluorine, m is a number 2 or 3, $R'_5$ is hydrogen, sulfo, or $C_1$–$C_4$alkoxy unsubstituted or substituted in the alkyl moiety by hydroxy or by sulfato, $R'_{5a}$ is hydrogen, $C_1$–$C_4$alkyl, $C_1$–$C_4$alkoxy, $C_2$–$C_4$alkanoylamino, ureido or a radical of formula (2f) wherein the radicals $R_{1a}$, $T_1$ and $X_1$ are as defined above and have the preferred meanings given above.

$R_4$, $R'_{5a}$ and $R_{13}$ as $C_1$–$C_4$alkyl may be, each independently of the others, for example, methyl, ethyl, n-propyl, isopropyl, n-butyl, sec-butyl, tert-butyl or isobutyl, preferably methyl or ethyl and especially methyl.

$R_4$, $R'_5$, $R'_{5a}$ and $R_{13}$ as $C_1$–$C_4$alkoxy may be, each independently of the others, for example, methoxy, ethoxy, n-propoxy, isopropoxy, n-butoxy or isobutoxy, preferably methoxy or ethoxy and especially methoxy. $R'_5$ is unsubstituted or may be substituted in the alkyl moiety by hydroxy or by sulfato.

$R_4$ and $R_{13}$ as halogen may be, each independently of the other, for example, fluorine, chlorine or bromine, preferably chlorine or bromine and especially chlorine.

$R'_{5a}$ as $C_2$–$C_4$alkanoylamino may be, for example, acetylamino or propionylamino, especially acetylamino.

$R'_{5a}$ as a radical of formula (2f) is preferably a radical wherein $R_{1a}$ is hydrogen, $T_1$ is amino; N-mono- or N,N-di-$C_1$–$C_4$alkylamino unsubstituted or substituted in the alkyl moiety by hydroxy, sulfato or by sulfo; morpholino; or phenylamino or N—$C_1$–$C_4$alkyl-N-phenyl-amino (wherein the alkyl is unsubstituted or substituted by hydroxy, sulfo or by sulfato) each unsubstituted or substituted in the phenyl ring by sulfo, carboxy, acetylamino, chlorine, methyl or by methoxy; or naphthylamino unsubstituted or substituted by from 1 to 3 sulfo groups, and $X_1$ is fluorine or chlorine, In the radical of the coupling component of formula (11b), the sulfo group in ring ii is preferably bonded in the 3- or 4-position. When ring ii contains a sulfo group, the radical of formula (11b) is preferably bonded in the 1-, 2- or 3-position of ring ii. When ring ii does not contain a sulfo group, the radical of formula (11b) is preferably bonded in the 2- or 3-position of ring ii.

The radical D especially corresponds to a radical of formula (9a), (9b), (9c), (9d) or (10a)

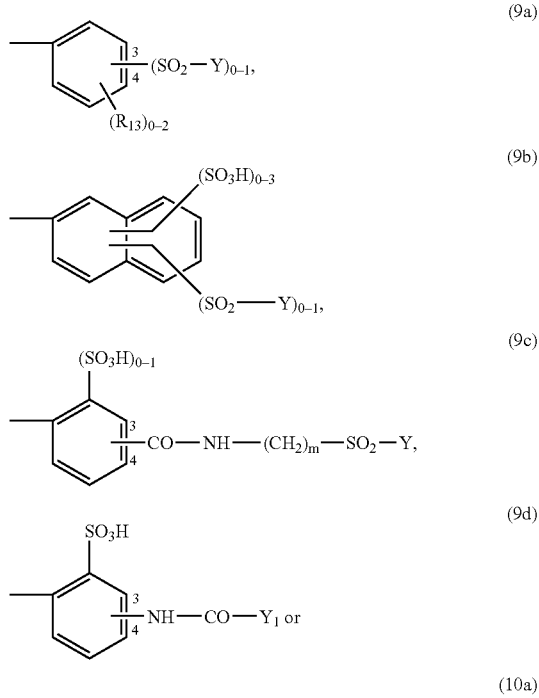

wherein
$R'_5$ is hydrogen, sulfo, or ethoxy unsubstituted or substituted in the alkyl moiety by hydroxy or by sulfato, $R'_{5a}$ is hydrogen, methyl, ethyl, methoxy, ethoxy, acetylamino, propionylamino or ureido, $(R_{13})_{0-2}$ denotes from 0 to 2 identical or different substituents selected from the group halogen, $C_1$–$C_4$alkyl, $C_1$–$C_4$alkoxy and sulfo, especially methyl, methoxy and sulfo, $Y_1$ is a group —CH(Br)—CH$_2$—Br or —C(Br)=CH$_2$, Y is vinyl, β-chloroethyl or β-sulfatoethyl, especially vinyl or β-sulfatoethyl, and m is a number 2 or 3, especially 2.

The numbers in the radicals of formulae (9a), (9c) and (9d) indicate the possible bonding positions of the fibre-reactive radical.

D is preferably a radical of formula (9a), (9b), (9c) or (10a), especially (9a) or (9c).

A is, for example, one of the following dye radicals:
a) dye radicals of a 1:1 copper complex azo dye, of the benzene or naphthalene series, wherein the copper atom is bonded to a group capable of being metallated on either side in the ortho-position to the azo bridge
b) dye radicals of a mono- or dis-azo dye of formula (12) or (13)

$$D_1\text{-}N=N\text{-}(M\text{-}N=N)_u\text{—}K_1\text{-} \quad (12)$$

$$\text{-}D_1\text{-}N=N\text{-}(M\text{-}N=N)_u\text{—}K_1 \quad (13),$$

or of a metal complex derived therefrom, wherein
$D_1$ is the radical of a diazo component, of the benzene or naphthalene series, M is the radical of a central component, of the benzene or naphthalene series, $K_1$ is the radical of a coupling component, of the benzene, naphthalene, pyrazolone, 6-hydroxypyrid-2-one or acetoacetic acid arylamide series, and u is a number 0 or 1, wherein $D_1$, M and $K_1$ may carry substituents customary for azo dyes c) dye radicals of a disazo dye of formula (14)

$$\text{-}D_3N=N\text{—}K_4\text{—}N=N\text{-}D_4 \quad (14)$$

wherein $D_3$ and $D_4$ are each independently of the other the radical of a diazo component, of the benzene or naphthalene series, and $K_4$ is the radical of a coupling component, of the naphthalene series, wherein $D_3$, $D_4$ and $K_4$ may carry substituents customary for azo dyes;

the expression "substituents customary for azo dyes" is intended to include both fibre-reactive and non-fibre-reactive substituents, for example the substituents mentioned above for D;

d) dye radicals of a formazan dye of formula (15)

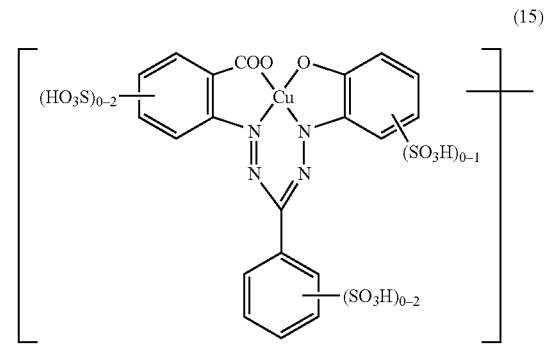

wherein the benzene rings contain no further substituents or are further substituted by $C_1$–$C_4$alkyl, $C_1$–$C_4$alkoxy, $C_1$–$C_4$alkylsulfonyl, halogen or by carboxy e) dye radicals of an anthraquinone dye of formula (16)

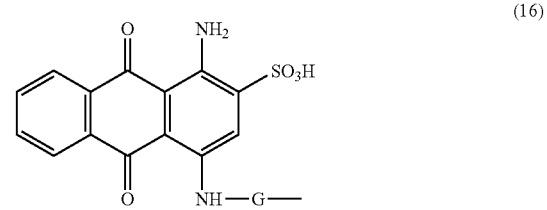

wherein G is a phenylene radical unsubstituted or substituted by $C_1$–$C_4$alkyl, $C_1$–$C_4$alkoxy, halogen, carboxy or by sulfo or is a cyclohexylene, phenylenemethylene or $C_2$–$C_8$alkylene radical f) dye radicals of a phthalocyanine dye of formula (17)

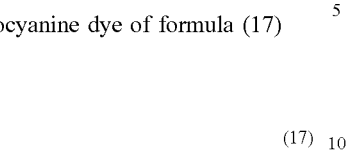
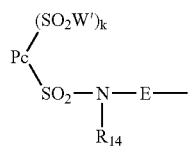

(17)

wherein Pc is the radical of a metal phthalocyanine, especially the radical of a copper or nickel phthalocyanine, W' is —OH and/or —$NR_{15}R_{15}'$, $R_{15}$ and $R_{15}'$ are each independently of the other hydrogen or $C_1$–$C_4$alkyl unsubstituted or substituted by hydroxy or by sulfo, $R_{14}$ is hydrogen or $C_1$–$C_4$alkyl, E is a phenylene radical unsubstituted or substituted by $C_1$–$C_4$alkyl, halogen, carboxy or by sulfo or is a $C_2$–$C_6$alkylene radical, and k is from 1 to 3 g) dye radicals of a dioxazine dye of formula (18)

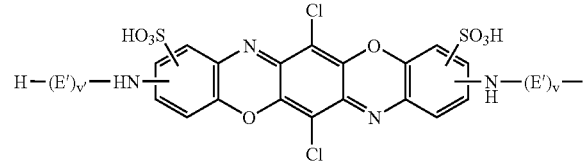

(18)

wherein E' is a phenylene radical unsubstituted or substituted by $C_1$–$C_4$alkyl, halogen, carboxy or by sulfo or is a $C_2$–$C_6$alkylene radical, v and v' are each independently of the other a number 0 or 1, and the outer benzene rings in formula (18) may be further substituted by $C_1$–$C_4$alkyl, $C_1$–$C_4$alkoxy, acetylamino, nitro, halogen, carboxy, sulfo or by a fibre-reactive radical of formula (2a), Y being as defined above and having the preferred meanings given above.

Especially important for A as a radical of a mono- or dis-azo dye in the dyes of formula (1) according to the invention are the dye radicals of formulae (8a), (8b), (8c), (8d), (8e), (8f), (8g) and (8h) indicated above, wherein $(R_4)_{0-3}$ and $Z_1$ are in each case as defined above and have the preferred meanings given above and $R_4$ in the dye radical of formula (8b) may in addition be $C_1$–$C_4$alkoxyanilino, and of the following formulae (19a), (19b), (19c), (19d), (19e), (19f), (19g), (19h), (19i), (19j), (19k), (19l), (19m), (19n), (19o), (19p), (19q), (19r) and (19s):

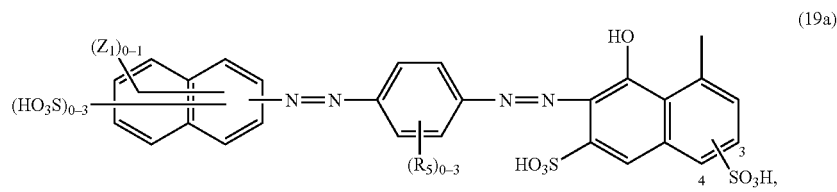

(19a)

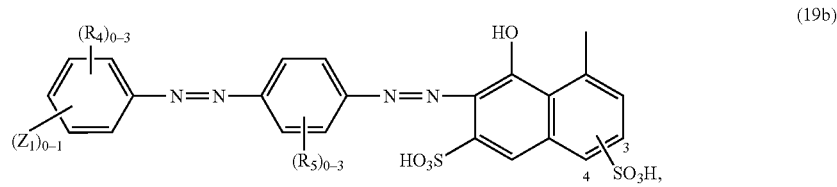

(19b)

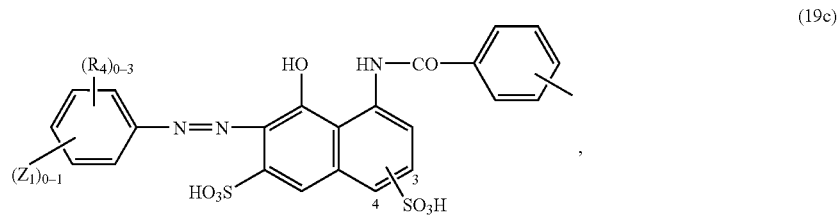

(19c)

wherein $(R_4)_{0-3}$ denotes from 0 to 3 identical or different substituents from the group $C_1$–$C_4$alkyl, $C_1$–$C_4$alkoxy, halogen, carboxy and sulfo, $(R_5)_{0-3}$ denotes from 0 to 3 identical or different substituents from the group halogen, nitro, cyano, trifluoromethyl, sulfamoyl, carbamoyl, $C_1$–$C_4$alkyl; $C_1$–$C_4$alkoxy unsubstituted or substituted by hydroxy, sulfato or by $C_1$–$C_4$alkoxy; amino, $C_2$–$C_4$alkanoylamino, ureido, hydroxy, carboxy, sulfomethyl, $C_1$–$C_4$alkylsulfonylamino and sulfo, and $Z_1$ is a radical of formula (2a), (2c), (2d), (2e), (2f) or (2g), preferably (2a), (2c), (2d) or (2e) and especially (2a), the mentioned radicals having the definitions and preferred meanings given above,

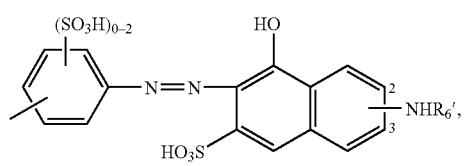
(19f)

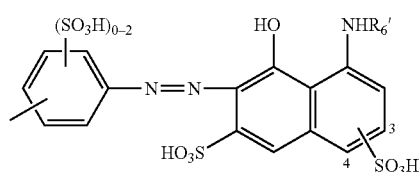
(19g)

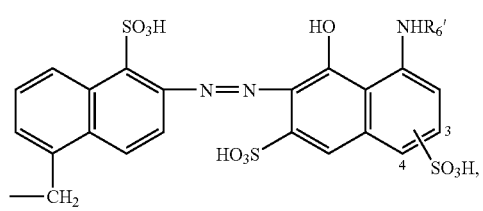
(19h)

wherein $R_6'$ is sulfophenyl, $C_2$–$C_4$alkanoyl, benzoyl or a radical of formula (2b) or (2f) indicated above, wherein the radicals are as defined above and have the preferred meanings given above, preferably $C_2$–$C_4$alkanoyl or benzoyl,

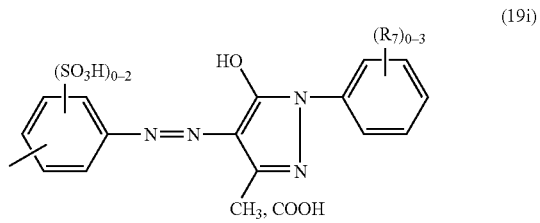
(19i)

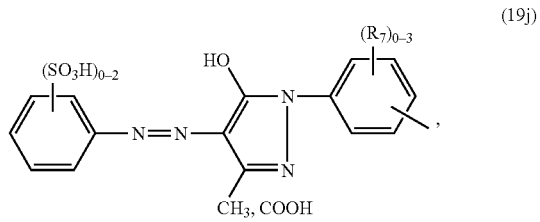
(19j)

wherein $(R_7)_{0-3}$ denotes from 0 to 3 identical or different substituents from the group $C_1$–$C_4$alkyl, $C_1$–$C_4$alkoxy, halogen, carboxy and sulfo,

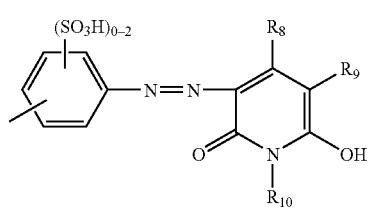
(19k)

wherein $R_8$ and $R_{10}$ are each independently of the other hydrogen, $C_1$–$C_4$alkyl or phenyl, and $R_9$ is hydrogen, cyano, carbamoyl or sulfomethyl,

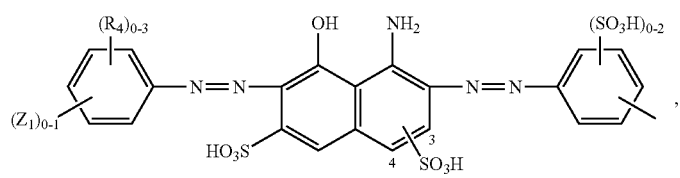
(19l)

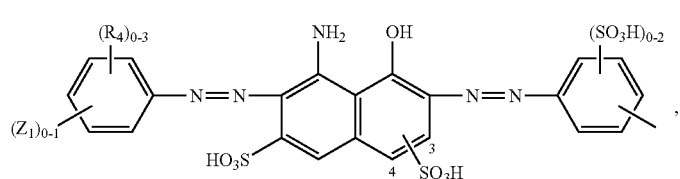
(19m)

-continued

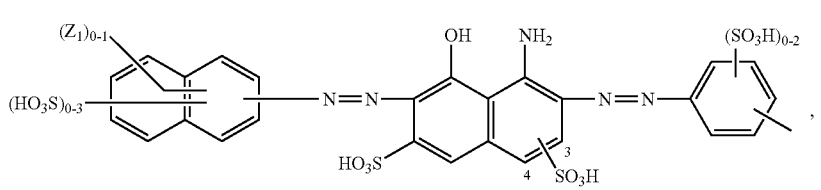
(19n)

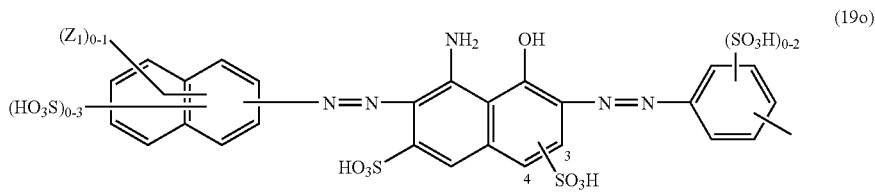
(19o)

wherein $(R_4)_{0-3}$ and $Z_1$ are in each case as defined above and have the preferred meanings given above,

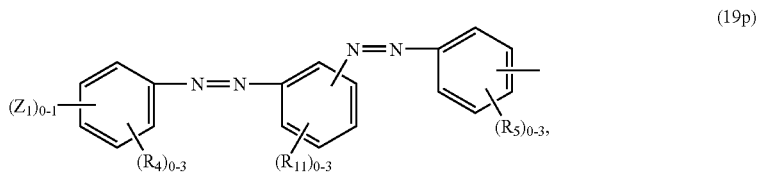
(19p)

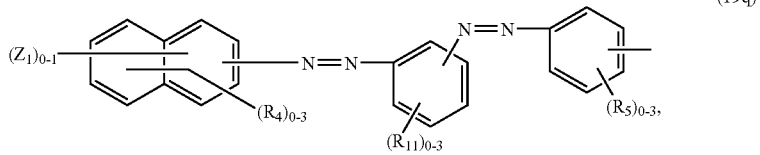
(19q)

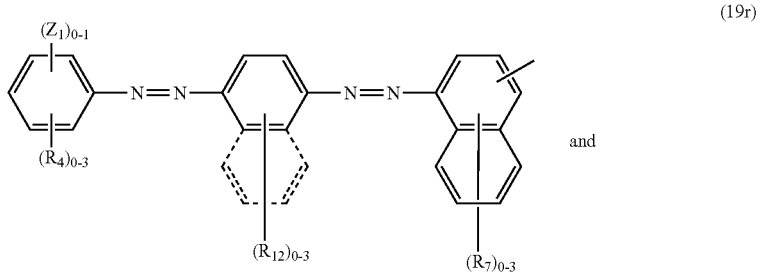
(19r)

and

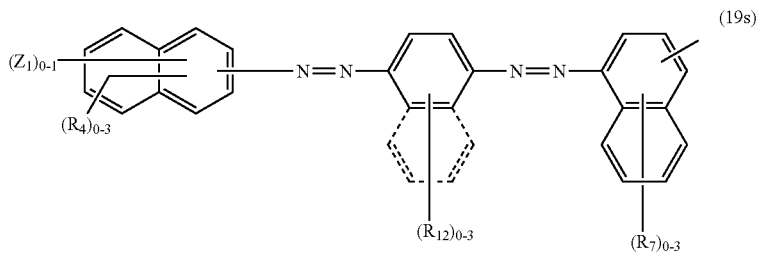
(19s)

wherein $(R_4)_{0-3}$ $(R_5)_{0-3}$ and $(R_7)_{0-3}$ are in each case as defined above and have the preferred meanings given above, $(R_{11})_{0-3}$ and $(R_{12})_{0-3}$ denote each independently of the other from 0 to 3 identical or different substituents from the group $C_1$–$C_4$alkyl, $C_1$–$C_4$alkoxy, halogen, carboxy and sulfo, and $Z_1$ is as defined above and has the preferred meaning given above.

The numbers on the naphthyl rings of the radicals of formulae (19a), (19b), (19c), (19f), (19g), (19h), (19l), (19m), (19n) and (19o) indicate the possible bonding positions.

$(R_4)_{0-3}$ in the disazoamino radicals of formulae (19q) and (19s) preferably denote from 1 to 3 sulfo groups.

$Z_1$ in the indicated dye radicals A is especially hydrogen.

Examples of suitable dye radicals A in the reactive dyes according to the invention are given in U.S. Pat. No. 5,484,899 (columns 13 to 40) and EP-A-0 623 655 (pages 11 to 27).

A is preferably the radical of a mono- or dis-azo dye.

In an especially preferred embodiment of the dyes according to the invention, A is a dye radical of formula (8a), (8b), (8c), (8d), (8e), (8f), (8g), (8h), (19d) or (19e), especially (8f) or (19d), wherein $(R_4)_{0-3}$, $(R_5)_{0-3}$ and $Z_1$ are in each case as defined above, and $(R_4)_{0-3}$ preferably denotes from 0 to 3 identical or different substituents from the group methyl, methoxy and sulfo, $(R_5)_{0-3}$ preferably denotes from 0 to 3 identical or different substituents from the group methyl, methoxy, β-hydroxyethoxy, β-sulfatoethoxy, sulfo, acetylamino and ureido, and $Z_1$ preferably may, if desired, be a fibre-reactive radical of formula (2a) wherein Y is vinyl or β-sulfatoethyl.

In a further especially preferred embodiment of the reactive dyes according to the invention, A is a dye radical of formula (19a), (19b), (19l) or (19n) indicated above wherein $(R_4)_{0-3}$, $(R_5)_{0-3}$ and $Z_1$ are in each case as defined above and have the preferred meanings given above.

A preferred embodiment of the present invention relates to reactive dyes of formula (1)

wherein
$Q_1$, $Q_2$, $Q_3$ and $Q_4$ are hydrogen,
A is the radical of a monoazo or disazo chromophore,
D is a radical of formula (9a), (9b), (9c), (9d) or (10a) indicated above, especially (9a) or (9c)

wherein
$R'_5$ is hydrogen, sulfo, or ethoxy unsubstituted or substituted in the alkyl moiety by hydroxy or by sulfato,
$R'_{5a}$ is hydrogen, methyl, ethyl, methoxy, ethoxy, acetylamino, propionylamino or ureido,
$(R_{13})_{0-2}$ denotes from 0 to 2 identical or different substituents selected from the group halogen, $C_1$–$C_4$alkyl, $C_1$–$C_4$alkoxy and sulfo, preferably methyl, methoxy and sulfo, and
m is a number 2 or 3, preferably 2,
$Y_1$ is a group —CH(Br)—CH$_2$—Br or —C(Br)=CH$_2$,
Y is vinyl, β-chloroethyl or β-sulfatoethyl, preferably vinyl or β-sulfatoethyl, and
X is chlorine or fluorine, preferably chlorine.

The present invention relates also to a process for the preparation of the reactive dyes according to the invention, which comprises reacting with one another, in any order, approximately one molar equivalent of a compound of formula (20)

A-NHQ$_1$ (20), approximately one molar equivalent of a compound of formula (21)

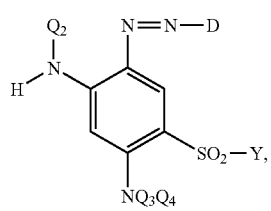

(21)

or suitable precursors of the compounds of formula (20) or (21), and approximately one molar equivalent of a halotriazine, preferably 2,4,6-trichloro- or 2,4,6-trifluoro-striazine, or, if using precursors of compounds of formula (20) or (21), converting the intermediates obtained into the desired dyes and, where appropriate, following on with a further transformation reaction, for example for transformation of a halogen atom on the triazine into any desired radical X; $Q_1$, $Q_2$, $Q_3$, $Q_4$, A, D and Y in each case being as defined above and having the preferred meanings given above.

The transformation, resulting from the use of precursors of compounds of formula (20) or (21), of intermediates into the end dyes consists especially of coupling reactions that result in azo dyes.

The halogen atom X on the triazine can be replaced by condensing the compound of formula (1) obtained wherein X is halogen, preferably fluorine or chlorine, with a compound X*—H wherein X* has the meanings given above for X except for halogen.

Such condensation reactions are known and described, for example, in EP-A-0 260 227 and U.S. Pat. No. 4,841,049.

The end product may optionally be subjected to a further transformation reaction. Such a transformation reaction is, for example, conversion of the radical Y having the meaning —CH$_2$CH$_2$-U, wherein U is as defined above, and a reactive group, present in D and capable of conversion into a vinyl group, into the vinyl form by treatment with dilute sodium hydroxide solution, e.g. conversion of the β-sulfatoethylsulfonyl or β-chloroethylsulfonyl group into the vinylsulfonyl radical. Such reactions are known per se.

Because the individual process steps mentioned above may be carried out in different orders as well as, where appropriate in some cases, simultaneously, different process variants are possible. The reaction is generally carried out in stepwise succession, the order of the simple reactions, known per se, between the individual reaction components being determined by the particular conditions.

A preferred variant of the preparation of the dyes according to the invention comprises reacting one molar equivalent of 2,4,6-trichloro- or 2,4,6-trifluoro-s-triazine first with one molar equivalent of a compound of formula (20) indicated above at approximately neutral pH and at low temperature, for example 0–5° C., and then with one molar equivalent of a compound of formula (22)

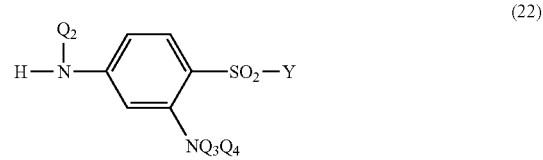

(22)

at a slightly acidic to neutral pH, for example pH 4.5–7.5, and at a temperature of, for example, 0–30° C., to form a compound of formula, (23)

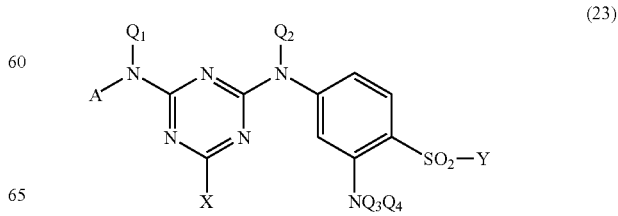

(23)

and coupling the compound of formula (23) to one molar equivalent of a conventionally diazotised compound of formula (24)

H$_2$N-D  (24)

at a neutral to slightly acidic pH and at a temperature of, for example, 0–20° C., Q, $Q_2$, $Q_3$, $Q_4$, A, D and Y in each case being as defined above and having the preferred meanings given above and X being chlorine or fluorine.

The diazotisation of the amines of formula (24) is effected in customary manner, for example using a nitrite, e.g. an alkali metal nitrite, such as sodium nitrite, in a mineral acid medium, for example a hydrochloric-acid-containing medium, at temperatures of, for example, from –5 to 40° C., preferably from –5 to 10° C. and especially from 0 to 5° C.

The compounds of formulae (20), (22) and (24) are known or can be prepared in analogy to known compounds.

The compound of formula (22) is described, for example, in U.S. Pat. No. 4,897,469 and U.S. Pat. No. 5,424,405 and is prepared, for example, by first reacting the compound of formula(25)

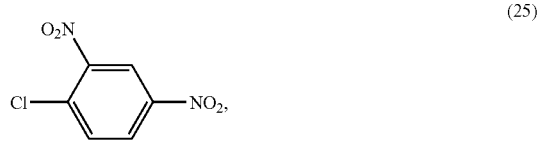

(25)

which is known per se, with 2-mercaptoethanol, oxidising the resulting compound to form the sulfonyl compound of formula (26)

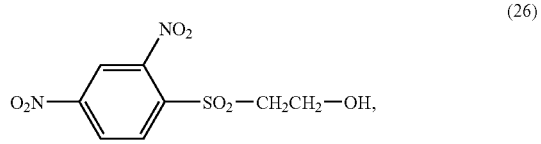

(26)

introducing a suitable leaving group U, for example —OSO$_3$H, and reducing the two nitro groups to form amino groups, resulting in the compound of formula(27)

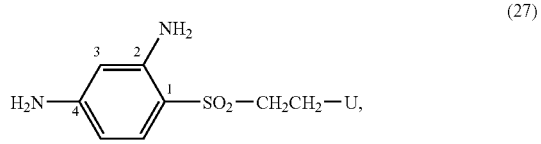

(27)

and, if desired, introducing at both amino groups or at one of the amino groups, preferably the amino group in the 2-position, a group $Q_2$ $Q_3$ and/or $Q_4$, for example by means of alkylation with at least one of the compounds of formulae $Q_2$-X', $Q_3$-X' and $Q_4$-X', wherein X' is halogen, for example chlorine, or by means of an addition reaction to an unsaturated precursor of the compound introducing the group $Q_2$ $Q_3$ and/or $Q_4$, for example acrylic acid, $Q_2$, $Q_3$ and $Q_4$ in each case being as defined above and having the preferred meanings given above. Such reactions are known and may be carried out, for example, in analogy to the procedure described in U.S. Pat. No. 6,222,067, by using the compound of formula (27) instead of the compound of formula (II) described in column 1 of U.S. Pat. No. 6,222,067, U being as defined above and having the preferred meaning given above, and proceeding as described in U.S. Pat. No. 6,222,067.

The reaction of the known compounds of formula (25) with 2-mercaptoethanol is carried out, for example, in a suitable solvent in the presence of potassium fluoride at elevated temperature, for example from 50 to 100° C. Suitable solvents therefor are, for example, water, lower alcohols, dioxane, toluene, xylenes, mono- or di-chlorobenzene, N,N-dimethylformamide and N-methylpyrrolidone.

The oxidation of the thioether compounds to form sulfones can be effected by various methods, for example using hydrogen peroxide with or without addition of suitable catalysts such as, for example, tungsten or vanadium compounds, or using peracetic acid, potassium permanganate or chromic acid, or using chlorine/hydrochloric acid each in an aqueous, aqueous-organic or organic medium.

The conversion of the hydroxyethylsulfonyl radical into a suitable reactive radical, for example into a sulfatoethylsulfonyl, thiosulfatoethylsulfonyl, phosphatoethylsulfonyl or vinylsulfonyl radical, is effected according to customary methods known per se.

The reduction of the nitro groups is likewise effected in a manner known per se, for example by catalytic hydrogenation using Pd/carbon in ethanol, ethyl acetate or tetrahydrofuran at from room temperature to about 40° C., or using Fe/hydrochloric acid or Fe/acetic acid in aqueous solution, resulting in the compound of formula (27).

The compound of formula (21) is obtained, for example, by coupling the compound of formula (22) to one molar equivalent of a conventionally diazotised compound of formula (24), at a neutral to slightly acidic pH and at a temperature of, for example, 0–20° C., $Q_2$, $Q_3$, $Q_4$, D and Y in each case being as defined above and having the preferred meanings given above.

The present invention accordingly relates to a reactive dye of formula

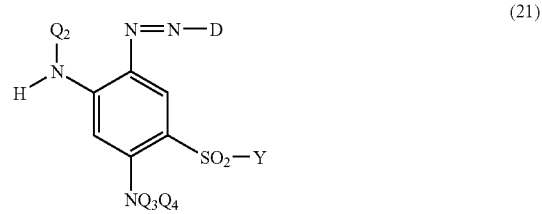

(21)

wherein $Q_2$, $Q_3$, $Q_4$, D and Y in each case are as defined above and have the preferred meanings given above.

The present invention relates also to a reactive dye of formula

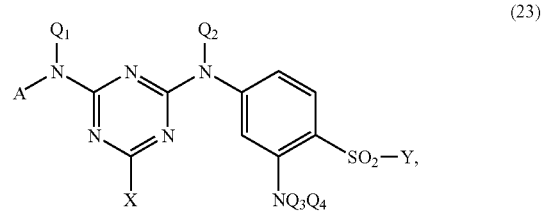

(23)

which is obtained as indicated above, wherein $Q_1$, $Q_2$, $Q_3$, $Q_4$, A, X and Y in each case are as defined above and have the preferred meanings given above.

In a particular embodiment, A as a radical of a mono- or dis-azo dye in the dyes of formula (23) according to the invention is a radical of formula (19a), (19b), (19c), (19d), (19e), (19f), (19g), (19h), (19i), (19j), (19k), (19l), (19m), (19n), (19o), (19p), (19q), (19r) or (19s).

The reactive dyes according to the invention are present either in the form of their free acid or, preferably, in the form of their salts. Suitable salts are, for example, alkali metal, alkaline earth metal or ammonium salts or salts of an organic amine. Examples that may be mentioned are sodium, lithium, potassium or ammonium salts or a mono-, di- or tri-ethanolamine salt.

The reactive dyes according to the invention are suitable for dyeing and printing a wide variety of materials, especially hydroxyl-group-containing or nitrogen-containing fibre materials. Examples include paper, silk, leather, wool, polyamide fibres and polyurethanes, and especially all types of cellulosic fibre materials. Such fibre materials are, for example, natural cellulose fibres, such as cotton, linen and hemp, and cellulose and regenerated cellulose. The dyes according to the invention are also suitable for dyeing or printing hydroxyl-group-containing fibres present in blend fabrics, for example blends of cotton and polyester fibres or polyamide fibres.

The present invention accordingly relates also to the use of reactive dyes according to the invention in the dyeing or printing of hydroxyl-group-containing or nitrogen-containing, especially cotton-containing, fibre materials.

The reactive dyes according to the invention can be applied to the fibre material and fixed to the fibre in a variety of ways, especially in the form of aqueous dye solutions or dye print pastes. They are suitable both for the exhaust process and for dyeing in accordance with the pad-dyeing process; they can be used at low dyeing temperatures and require only short steaming times in the pad-steam process. The degrees of fixing are high and unfixed dye can be washed off readily, the difference between the degree of exhaustand the degree of fixing being remarkably small, that is to say the soaping loss is very small. The reactive dyes according to the invention are also suitable for printing, especially on cotton, and also for printing nitrogen-containing fibres, for example wool or silk or blend fabrics that contain wool.

The dyeings and prints produced using the reactive dyes according to the invention have a high tinctorial strength and a high fibre-dye binding stability in both the acidic and the alkaline range, and also good fastness to light and very good wet-fastness properties, such as fastness to washing, to water, to seawater, to cross-dyeing and to perspiration. The dyeings obtained exhibit fibre levelness and surface levelness.

The following Examples serve to illustrate the invention. Unless otherwise indicated, the temperatures are given in degrees Celsius, parts are parts by weight and percentages relate to percent by weight. Parts by weight relate to parts by volume in a ratio of kilograms to liters.

EXAMPLE 1 a) 217 parts of potassium fluoride are introduced into a solution of 500 parts of 2,4dinitro-1-chlorobenzene in 590 parts of N,N-dimethylformamide (DMF) and the reaction mixture is stirred for 5 hours at room temperature. 350 parts of 2-mercaptoethanol are then added dropwise, whereupon the internal temperature rises to from 60 to 65° C., and stirring is then carried out for about 15 hours at that temperature. Then, any starting materials still present are made to react by adding 34 parts of potassium carbonate. Finally, the mixture is left to cool to room temperature, salts are filtered off and the filtrate is concentrated. The oily crude product is discharged onto water, whereupon a yellow crystalline precipitate separates out. After filtering off under suction, washing and drying, 2-[2,4-dinitrophenylsulfanyl]ethanol is obtained in an almost quantitative yield and high purity.

b) A suspension of 220 parts of Oxone® in 150 parts of water is introduced into a solution of 140 parts of 2-[2, 4-dinitrophenylsulfanyl]ethanol in 1100 parts of methanol and the reaction mixture is refluxed for about 1 hour, with stirring. There are then added 3.5 parts of ammonium heptamolybdate dissolved in a small amount of water, and also 30 parts of 30% hydrogen peroxide, and stirring is carried out, under reflux, until the reaction has ceased. After the reaction is complete, saturated sodium disulfite solution is added until peroxide is no longer detectable; the mixture is cooled to from 0 to 5° C., salts are filtered off and the filtrate is concentrated. The product that crystallises out is filtered off under suction, washed and dried. 2-[2,4-Dinitrophenylsulfonyl]ethanol is obtained in a good yield.

c) 105 parts of 2-[2,4-dinitrophenylsulfonyl]ethanol are slowly introduced, at from 0 to 5° C., into 380 parts of sulfuric acid monohydrate and stirring is carried out for 14 hours at that temperature. The brown solution obtained is then slowly discharged onto a mixture of ice and 20% sodium chloride solution, whereupon a yellowish suspension is formed. The precipitate is filtered off and washed first with 1000 parts of cold 20% sodium chloride solution and then with 200 parts of ice-water. After drying, 2-[2, 4-dinitrophenylsulfonyl]ethyl hydrogen sulfate is obtained in a very good yield and very good purity.

d) 19 parts of acetic acid are added, at 80° C., to a suspension of 180 parts of iron in 500 parts of water and stirred for 5 minutes. The mixture is then cooled to 60° C. and 150 parts of 2-[2,4-dinitrophenylsulfonyl]ethyl hydrogen sulfate are slowly introduced. After 30 minutes, the reaction mixture is cooled to from 0 to 5° C., and the insoluble constituents are filtered off. The filtrate is concentrated. After drying, the compound of formula (101) is obtained

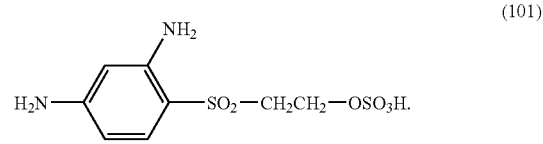

(101)

EXAMPLE 2

17.3 Parts of an Amine of Formula $D_{10}$-$NH_2$ Wherein $D_{10}$ is a Radical of Formula

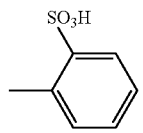

are introduced into 215 parts of water and stirred well. At 0° C., 25 parts of 4N sodium nitrite solution are added to the solution obtained, and then 20 parts of concentrated hydrochloric acid are slowly added dropwise at from 0 to 5° C. Stirring is carried out for 1 hour at that temperature.

EXAMPLE 3

14.5 Parts of an Amine of Formula $D_{11}$-$NH_2$ Wherein $D_{11}$ is a Radical of Formula

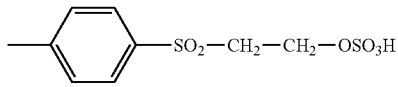

are introduced into 60 parts of water and stirred well. At 10° C., first 13 parts of 4N sodium nitrite solution and then 23.4 parts of 31% naphthalenesulfonic acid solution are added to the suspension obtained. Stirring is then carried out for 3 hours at from 15 to 20° C.

EXAMPLES 4 to 32

The diazo compounds of the amines indicated in Table 1 can be prepared analogously to the procedure described in Example 2 or 3 by using, instead of the amine of formula $D_{10}$-$NH_2$ or $D_{11}$-$NH_2$ indicated in Example 2 or 3, an equimolar amount of an amine of formula $D_{xy}$-$NH_2$ indicated in Table 1.

TABLE 1

| Ex. | Amine $D_{xy}$—$NH_2$ | $D_{xy}$ |
|---|---|---|
| 4 | $D_{12}$—$NH_2$ | $D_{12}$ = 3-substituted phenyl—$SO_2$—$CH_2$—$CH_2$—$OSO_3H$ |
| 5 | $D_{13}$—$NH_2$ | $D_{13}$ = phenyl with $HO_3S$ ortho, —$SO_2$—$CH_2$—$CH_2$—$OSO_3H$ |
| 6 | $D_{14}$—$NH_2$ | $D_{14}$ = phenyl with $HO_3S$ ortho, —HN—C(=O)—CHBr—CH$_2$Br |
| 7 | $D_{15}$—$NH_2$ | $D_{15}$ = phenyl—CONH—$(CH_2)_2$—$SO_2$—$(CH_2)_2$—$OSO_3H$ |
| 8 | $D_{16}$—$NH_2$ | $D_{16}$ = phenyl with $HO_3S$ ortho, —CONH—$(CH_2)_2$—$SO_2$—$(CH_2)_2$—$OSO_3H$ |
| 9 | $D_{17}$—$NH_2$ | $D_{17}$ = phenyl with $HO_3S$, —$SO_3H$ |
| 10 | $D_{18}$—$NH_2$ | $D_{18}$ = phenyl with $HO_3S$, —$OCH_3$ |

TABLE 1-continued

| Ex. | Amine $D_{xy}$—$NH_2$ | $D_{xy}$ |
|---|---|---|
| 11 | $D_{19}$—$NH_2$ | $D_{19}$ = 3-methylphenyl-CONH—(CH$_2$)$_2$—SO$_2$—(CH$_2$)$_2$—OSO$_3$H |
| 12 | $D_{20}$—$NH_2$ | $D_{20}$ = 4-methoxy-3-methylphenyl with SO$_2$—CH$_2$—CH$_2$—OSO$_3$H |
| 13 | $D_{21}$—$NH_2$ | $D_{21}$ = 2-methoxy-5-methylphenyl with OCH$_3$, CH$_3$ and SO$_2$—CH$_2$—CH$_2$—OSO$_3$H |
| 14 | $D_{22}$—$NH_2$ | $D_{22}$ = 2,5-dimethoxy-4-methylphenyl with SO$_2$—CH$_2$—CH$_2$—OSO$_3$H |
| 15 | $D_{23}$—$NH_2$ | $D_{23}$ = naphthalene with SO$_3$H at 1-position, methyl at 7, and SO$_2$—CH$_2$—CH$_2$—OSO$_3$H at 6 |
| 16 | $D_{24}$—$NH_2$ | $D_{24}$ = naphthalene with SO$_3$H at 1, methyl at 7, and SO$_2$—CH$_2$—CH$_2$—OSO$_3$H at 5 |
| 17 | $D_{25}$—$NH_2$ | $D_{25}$ = naphthalene with SO$_2$—CH$_2$—CH$_2$—OSO$_3$H at 1 and methyl at 7 |

TABLE 1-continued
| Ex. | Amine $D_{xy}$—$NH_2$ | $D_{xy}$ |
|---|---|---|
| 18 | $D_{26}$—$NH_2$ | $D_{26}$ = 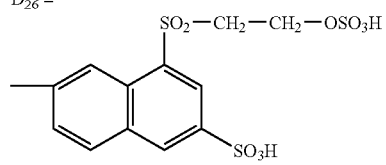 |
| 19 | $D_{27}$—$NH_2$ | $D_{27}$ = 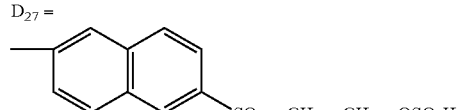 |
| 20 | $D_{28}$—$NH_2$ | $D_{28}$ = 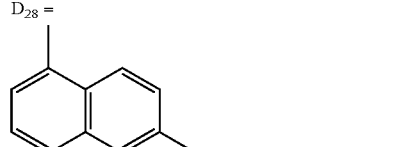 |
| 21 | $D_{29}$—$NH_2$ | $D_{29}$ = 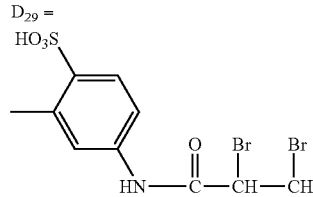 |
| 22 | $D_{30}$—$NH_2$ | $D_{30}$ = 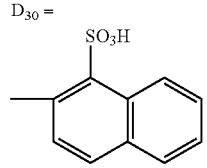 |
| 23 | $D_{31}$—$NH_2$ | $D_{31}$ = 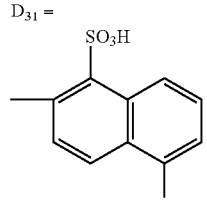 |
| 24 | $D_{32}$—$NH_2$ | $D_{32}$ = 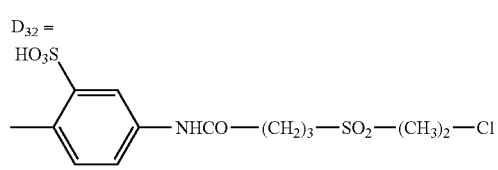 |
| 25 | $D_{33}$—$NH_2$ | $D_{33}$ = 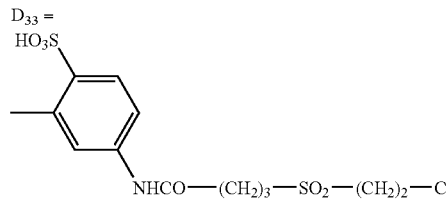 |

TABLE 1-continued
| Ex. | Amine $D_{xy}$—$NH_2$ | $D_{xy}$ |
|---|---|---|
| 26 | $D_{34a}$—$NH_2$—$D_{34r}$—$NH_2$ | $D_{34a}$—$D_{34r}$ = 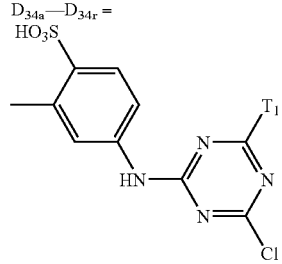 |
$T_1$:
| 26a | $D_{34a}$—$NH_2$ | $D_{34a}$ 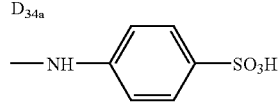 |
| 26b | $D_{34b}$—$NH_2$ | $D_{34b}$ 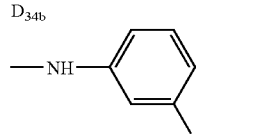 |
| 26c | $D_{34c}$—$NH_2$ | $D_{34c}$ 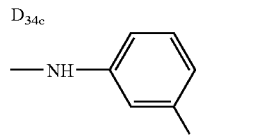 |
| 26d | $D_{34d}$—$NH_2$ | $D_{34d}$ 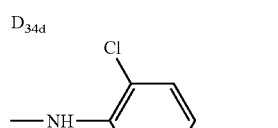 |
| 26e | $D_{34e}$—$NH_2$ | $D_{34e}$—$NHCH_2CH_2OH$ |
| 26f | $D_{34f}$—$NH_2$ | $D_{34f}$—$N(CH_2CH_2OH)_2$ |
| 26g | $D_{34g}$—$NH_2$ | $D_{34g}$ 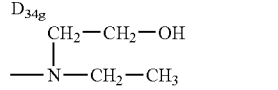 |
| 26h | $D_{34h}$—$NH_2$ | $D_{34h}$ 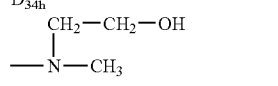 |
| 26i | $D_{34i}$—$NH_2$ | $D_{34i}$—NH—$(CH_2)_2$—O—$(CH_2)_2$—OH |
| 26j | $D_{34j}$—$NH_2$ | $D_{34j}$—$NHCH_2CH_2SO_3H$ |
| 26k | $D_{34k}$—$NH_2$ | $D_{34k}$ 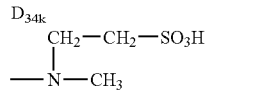 |
| 26l | $D_{34l}$—$NH_2$ | $D_{34l}$ 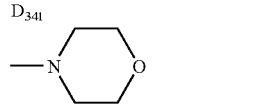 |

TABLE 1-continued

| Ex. | Amine $D_{xy}$—$NH_2$ | $D_{xy}$ |
|---|---|---|
| 26m | $D_{34m}$—$NH_2$ | $D_{34m}$—NH—$(CH_2)_2$—$SO_2$—$(CH_2)_2$—Cl |
| 26n | $D_{34n}$—$NH_2$ | $D_{34n}$—NH—$(CH_2)_2$—O—$(CH_2)_2$—$SO_2$—$(CH_2)_2$—Cl |

26o  $D_{34o}$—$NH_2$     $D_{34o}$

—NH—⟨phenyl⟩—$SO_2$—$CH_2CH_2$—$OSO_3H$

26p  $D_{34p}$—$NH_2$     $D_{34p}$

—NH—⟨phenyl⟩—$SO_2$—$CH_2CH_2$—$OSO_3H$ (meta)

26q  $D_{34q}$—$NH_2$     $D_{34q}$

—NH—⟨phenyl⟩—$CONH(CH_2)_2SO_2(CH_2)_2$—$OSO_3H$

26r  $D_{34r}$—$NH_2$     $D_{34r}$ $HO_3S$—⟨phenyl, methyl⟩—NHCO—CHBr—$CH_2Br$

27  $D_{35}$—$NH_2$     $D_{35}$ =

$HO_3S$—⟨phenyl, methyl⟩—HN—⟨2,5,6-trichloropyrimidin-4-yl⟩

28  $D_{36}$—$NH_2$     $D_{36}$ =

$HO_3S$—⟨phenyl, methyl⟩—HN—⟨5-chloro-2,6-difluoropyrimidin-4-yl⟩

TABLE 1-continued

| Ex. | Amine $D_{xy}-NH_2$ | $D_{xy}$ |
|---|---|---|
| 29 | $D_{37}-NH_2$ | $D_{37}$ = (structure: methyl-, HO$_3$S-substituted phenyl-N=N-phenyl-SO$_2$-CH$_2$-CH$_2$-OSO$_3$H, with NH-linked chloro-amino-triazine) |
| 30 | $D_{38}-NH_2$ | $D_{38}$ = (structure: methyl-, HO$_3$S-substituted phenyl-N=N-phenyl-SO$_3$H) |
| 31 | $D_{39}-NH_2$ | $D_{39}$ = (structure: H$_3$CO-, CH$_3$-substituted phenyl-N=N-phenyl with HO$_3$S, -SO$_2$-CH$_2$-CH$_2$-OSO$_3$H) |
| 32 | $D_{40}-NH_2$ | $D_{40}$ = (structure: phenyl-CONH-(CH$_2$)$_2$-SO$_2$-(CH$_2$)$_2$-Cl) |

EXAMPLE 33

9.3 parts of cyanuric chloride are suspended in 100 parts of ice/water mixture and stirred. A solution of 27 parts of 7-(4-amino-2-ureido-phenylazo)-naphthalene-1,3,6-trisulfonic acid in 200 parts of water is added dropwise at from 0 to 5° C. and at a pH of about 7 to the resulting suspension and the hydrochloric acid that forms is neutralised by adding 2N sodium hydroxide solution. A solution of 15.0 parts of the compound of formula (101) according to Example 1 in 120 parts of water is then added dropwise at from 3 to 5° C. and at a pH of from 5 to 5.5 to the reaction solution and the latter is then stirred for a further 2 to 3 hours at from 5 to 30° C. and at a pH of from 5 to 7.5. The pH is then adjusted to 4.5. The solution comprises the reactive dye of formula (102)

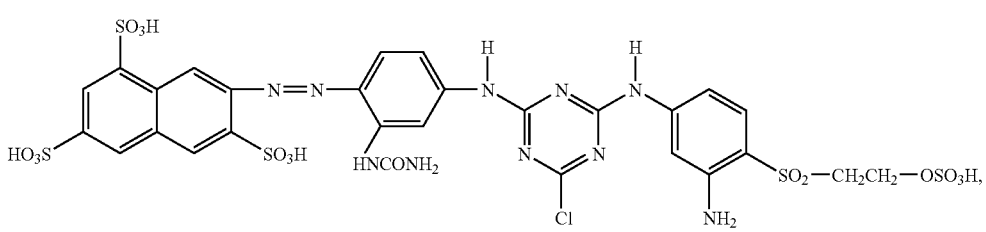

(102)

which serves as the coupling component in the following reaction step.

The diazonium salt solution according to Example 3 is added dropwise over the course of about 1 hour to the solution of the coupling component. After about 2 hours at from 2 to 14° C. and at a pH of from 4.5 to 5.5, the reaction is complete. The dye solution obtained is desalted and freeze-dried; there is obtained the dye of formula

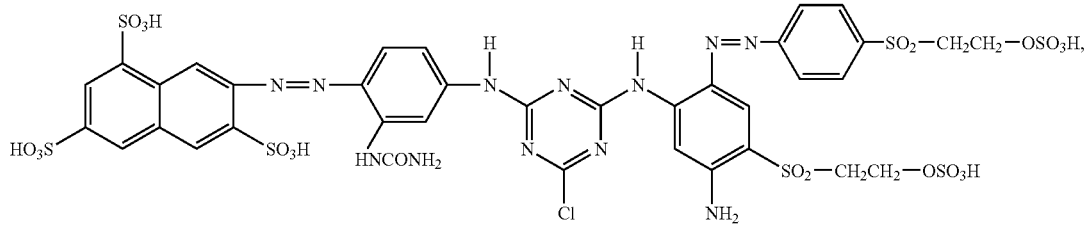

(103)

which dyes cellulose fibres golden-yellow shades having good all-round fastness properties.

EXAMPLE 34

27 parts of 7-(4-amino-2-ureido-phenylazo)-naphthalene-1,3,6-trisulfonic acid are dissolved in 400 parts of water at neutral pH and, over the course of about 30 minutes, 8.5 parts of cyanuric fluoride are added dropwise at from 0 to 2° C. 15.8 parts of the compound of formula (101) according to Example 1 in 120 parts of water are added dropwise to the reaction solution at from 2 to 20° C. and at a pH of from 5.5 to 6 and the resulting solution is then cooled to from 0 to 5° C. The solution comprises the reactive dye of formula (104)

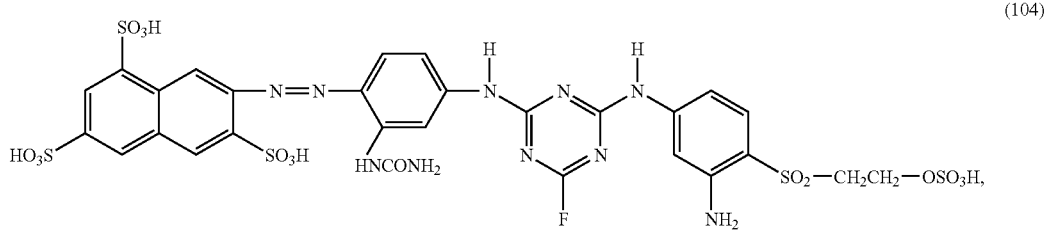

(104)

which serves as the coupling component in the following reaction step.

The diazonium salt solution according to Example 3 is added dropwise to the solution of the coupling component. Coupling is carried out at from 2 to 15° C. and at a pH of from 5 to 7. After the reaction is complete, the pH is increased to 10, and the reaction solution is stirred for about 20 minutes at room temperature and neutralised. The resulting dye solution is desalted and freeze-dried; there is obtained the dye of formula (105)

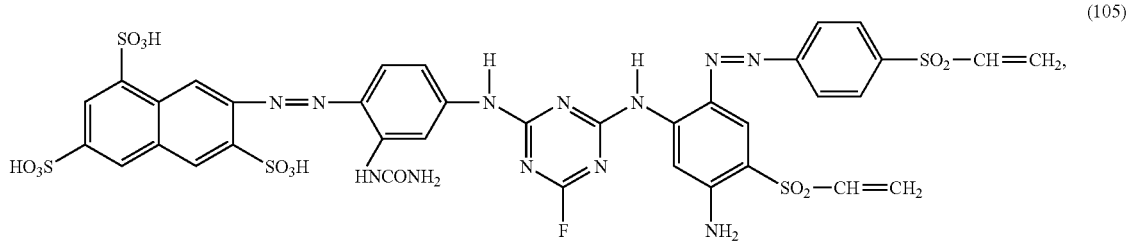

(105)

which dyes cellulose fibres strong yellow shades having good all-round fastness properties.

EXAMPLE 35

14.8 parts of cyanuric chloride are suspended in 150 parts of ice/water mixture and stirred. A solution of 42.2 parts of 8-amino-1-hydroxy-2-(1-sulfonaphth-2-yl-azo)-naphthalene-3,6-disulfonic acid in 600 parts of water is added dropwise at from 0 to 5° C. and at a pH of about 7 to the resulting suspension and the hydrochloric acid that forms is neutralised by adding 2N sodium hydroxide solution. A solution of 25.0 parts of the compound of formula (101) according to Example 1 in 180 parts of water is then added dropwise to the reaction solution, whereupon the pH falls to about 3.5. The reaction solution, which comprises the reactive dye of formula (106)

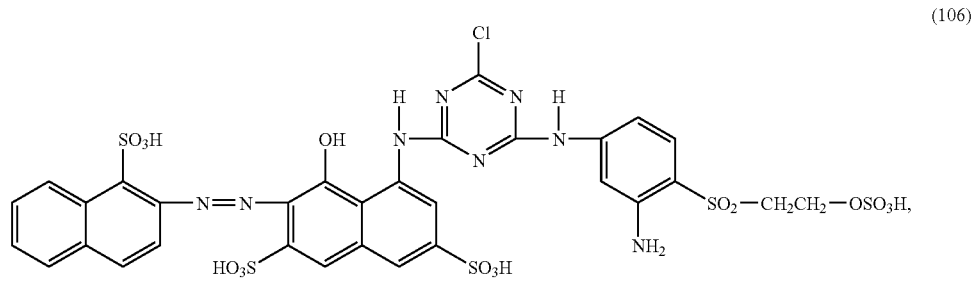

(106)

is then stirred for about from 2 to 3 hours at from 5 to 30° C. and at a pH of from 3.5 to 5 and is subsequently cooled to from 0 to 5° C.

A diazonium salt solution prepared according to Example 3 comprising 22.5 parts of an amine $D_{11}$-$NH_2$ wherein $D_{11}$ corresponds to a radical of the formula indicated in Example 3 is added dropwise to the solution of the coupling component and is coupled at from 0 to 25° C. and at a pH of from 4 to 6. The resulting dye solution is desalted and freeze-dried. There is obtained the dye of formula (107)

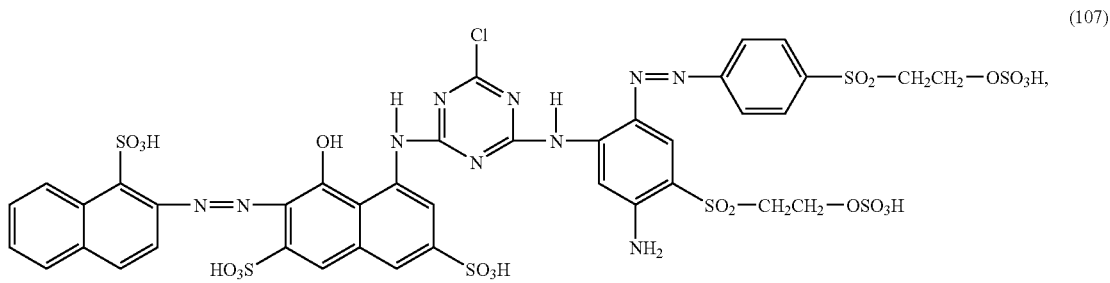

(107)

which dyes cellulose fibres in yellow-tinged red shades having good all-round fastness properties.

Examples 36 to 82: Analogously to the procedure described in Example 33, there can be prepared further reactive dyes of the general formula

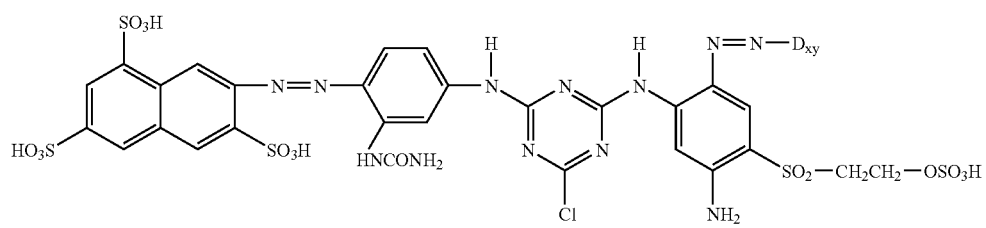

wherein the variable $D_{xy}$ is in each case the radical indicated in Table 2 and those radicals have the meanings indicated in each case in Example 2 and Table 1. The reactive dyes dye cellulose fibres in yellow shades having good all-round fastness properties.

TABLE 2

| Ex. | $D_{xy}$ |
|---|---|
| 36 | $D_{10}$ |
| 37 | $D_{12}$ |
| 38 | $D_{13}$ |
| 39 | $D_{14}$ |
| 40 | $D_{15}$ |
| 41 | $D_{16}$ |
| 42 | $D_{17}$ |
| 43 | $D_{18}$ |
| 44 | $D_{19}$ |
| 45 | $D_{20}$ |
| 46 | $D_{21}$ |
| 47 | $D_{22}$ |
| 48 | $D_{23}$ |
| 49 | $D_{24}$ |
| 50 | $D_{25}$ |
| 51 | $D_{26}$ |
| 52 | $D_{27}$ |
| 53 | $D_{28}$ |
| 54 | $D_{29}$ |
| 55 | $D_{30}$ |
| 56 | $D_{31}$ |
| 57 | $D_{32}$ |
| 58 | $D_{33}$ |
| 59 | $D_{34a}$ |
| 60 | $D_{34b}$ |
| 61 | $D_{34c}$ |
| 62 | $D_{34d}$ |
| 63 | $D_{34e}$ |
| 64 | $D_{34f}$ |
| 65 | $D_{34g}$ |
| 66 | $D_{34h}$ |
| 67 | $D_{34i}$ |
| 68 | $D_{34j}$ |
| 69 | $D_{34k}$ |
| 70 | $D_{34l}$ |

TABLE 2-continued

| Ex. | $D_{xy}$ |
|---|---|
| 71 | $D_{34m}$ |
| 72 | $D_{34n}$ |
| 73 | $D_{34o}$ |
| 74 | $D_{34p}$ |
| 75 | $D_{34q}$ |
| 76 | $D_{34r}$ |
| 77 | $D_{35}$ |
| 78 | $D_{36}$ |
| 79 | $D_{37}$ |
| 80 | $D_{38}$ |
| 81 | $D_{39}$ |
| 82 | $D_{40}$ |

EXAMPLES 83 to 129

Analogously to Examples 33 to 35, there can be prepared further reactive dyes of the general formula

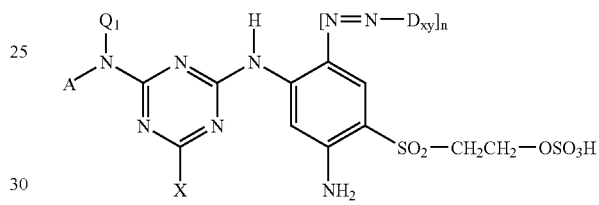

from the dyes A-NHQ$_1$, the diazo components $D_{xy}$-NH$_2$ (where n=1) and, where appropriate, the compounds X*—H, the variables A, Q$_1$, $D_{xy}$ and X in each case being the radicals indicated in Table 3 and n being a number 0 or 1; the variables $D_{xy}$ are as defined above in Table 1 and Examples 2 and 3.

TABLE 3

| Ex. | Dye<br>A—NHQ$_1$ | Diazo component<br>$D_{xy}$—NH$_2$ | X bzw. X* |
|---|---|---|---|
| 83 | [structure: H$_2$NOC, CH$_3$, HO$_3$S-phenyl-N=N-, pyridone with OH, N-C$_2$H$_5$, =O, NH$_2$] | $D_{11}$—NH$_2$ | Cl |
| 84 | [structure: HO$_3$SH$_2$C, CH$_3$, HO$_3$S-phenyl-N=N-, pyridone with OH, N-C$_2$H$_5$, =O, NH$_2$] | $D_{11}$—NH$_2$ | Cl |

TABLE 3-continued

| Ex. | Dye A—NHQ₁ | Diazo component D$_{xy}$—NH₂ | X bzw. X* |
|---|---|---|---|
| 85 | (naphthalene with HO₃S, HO₃S, SO₃H substituents, azo-linked to phenyl with H₂NCONH, NH₂) | D$_{11}$—NH₂ | morpholine (O, NH ring) |
| 86 | (naphthalene with OH, H₂N, SO₃H substituents, azo-linked to phenyl with HO₃S) | D$_{10}$—NH₂ | Cl |
| 87 | (pyridone: CH₃, H₂NOC, N-C₂H₅, OH, =O; azo-linked to phenyl with HO₃S, SO₃H, NH₂) | D$_{19}$—NH₂ | F |
| 88 | (pyrazole with HO₃S-phenyl, OH, COOH; azo-linked to phenyl with HO₃S, NH₂) | D$_{12}$—NH₂ | Cl |
| 89 | (naphthalene with HO₃S, SO₃H; azo-linked to phenyl with H₃COCNH, NH₂) | D$_{17}$—NH₂ | Cl |
| 90 | (naphthalene with HO₃S, HO₃S; azo-linked to phenyl with H₃COCNH, NH₂) | D$_{12}$—NH₂ | Cl |
| 91 | (phenyl with HO₃S, SO₃H; azo-linked to phenyl with NH₂, HNCONH₂) | D$_{11}$—NH₂ | F |
| 92 | (naphthalene with OH, H₂N, SO₃H; azo-linked to phenyl with HO₃S, SO₃H) | D$_{11}$—NH₂ | Cl |

TABLE 3-continued

| Ex. | Dye A—NHQ₁ | Diazo component D$_{xy}$—NH₂ | X bzw. X* |
|---|---|---|---|
| 93 | 6-amino-1-hydroxy-2-[(4-methyl-2,5-disulfophenyl)azo]naphthalene-3-sulfonic acid | D$_{19}$—NH₂ | Cl |
| 94 | 1-hydroxy-6-(methylamino)-2-[(2-sulfophenyl)azo]naphthalene-3-sulfonic acid | D$_{11}$—NH₂ | Cl |
| 95 | 6-amino-1-hydroxy-2-[(1,5-disulfonaphthalen-2-yl)azo]naphthalene-3-sulfonic acid | D$_{11}$—NH₂ | Cl |
| 96 | 7-[[4-[(4-aminophenyl)azo]phenyl]azo]naphthalene-1,3,5-trisulfonic acid | D$_{11}$—NH₂ | Cl |
| 97 | 1-hydroxy-6-(methylamino)-2-[(4-methoxy-2-sulfophenyl)azo]naphthalene-3-sulfonic acid | D$_{12}$—NH₂ | 3-sulfo-N-methylanilino |
| 98 | 8-amino-1-hydroxy-2-[(2-sulfophenyl)azo]naphthalene-3,6-disulfonic acid | D$_{19}$—NH₂ | Cl |
| 99 | 8-amino-1-hydroxy-2-[(4-methyl-2-sulfophenyl)azo]naphthalene-3,6-disulfonic acid | D$_{11}$—NH₂ | F |
| 100 | 8-amino-1-hydroxy-2-[(1,5-disulfonaphthalen-2-yl)azo]naphthalene-3,6-disulfonic acid | D$_{12}$—NH₂ | Cl |

TABLE 3-continued

| Ex. | Dye A—NHQ₁ | Diazo component D$_{xy}$—NH₂ | X bzw. X* |
|---|---|---|---|
| 101 | 5-(H₃CCH₂CONH)-4-hydroxy-3-[(2-sulfo-5-aminophenyl)azo]naphthalene-2,7-disulfonic acid | D$_{12}$—NH₂ | Cl |
| 102 | 5-(benzoylamino)-4-hydroxy-3-[(2-sulfo-5-aminophenyl)azo]naphthalene-2,7-disulfonic acid | D$_{11}$—NH₂ | Cl |
| 103 | 5-amino-4-hydroxy-3-[(1-sulfo-6-(2-sulfatoethylsulfonyl)naphthalen-2-yl)azo]naphthalene-2,7-disulfonic acid | D$_{18}$—NH₂ | Cl |
| 104 | 5-[(4-aminobenzoyl)amino]-4-hydroxy-3-[(2-sulfophenyl)azo]naphthalene-2,7-disulfonic acid | D$_{12}$—NH₂ | Cl |
| 105 | Cu-complex dye with amino, SO₃H, and phenyl formazan groups | D$_{11}$—NH₂ | F |
| 106 | Cu-complex dye with amino, SO₃H, and phenyl formazan groups | D$_{16}$—NH₂ | Cl |

TABLE 3-continued

| Ex. | Dye A—NHQ₁ | Diazo component D$_{xy}$—NH₂ | X bzw. X* |
|---|---|---|---|
| 107 | (structure) | D₁₁—NH₂ | F |
| 108 | (structure) | D₁₁—NH₂ | Cl |
| 109 | (structure) | D₁₁—NH₂ | HN(CH₂CH₂OH)₂ |
| 110 | (structure) | D₁₁—NH₂ | F |
| 111 | (structure) | D₁₁—NH₂ | Cl |
| 112 | (structure) | D₁₈—NH₂ | F |

TABLE 3-continued
| Dye | | Diazo component | |
|---|---|---|---|
| Ex. | A—NHQ₁ | D_{xy}—NH₂ | X bzw. X* |
| 113 | 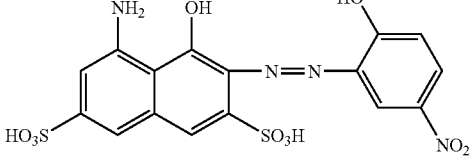 1:2 Cr-Komplex | D₁₁—NH₂ | Cl |
| 114 | 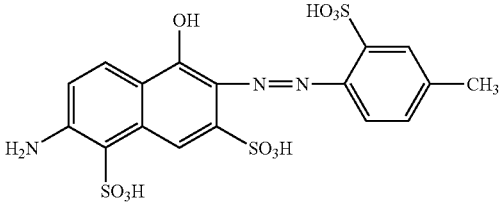 | D₁₁—NH₂ | Cl |
| 115 | 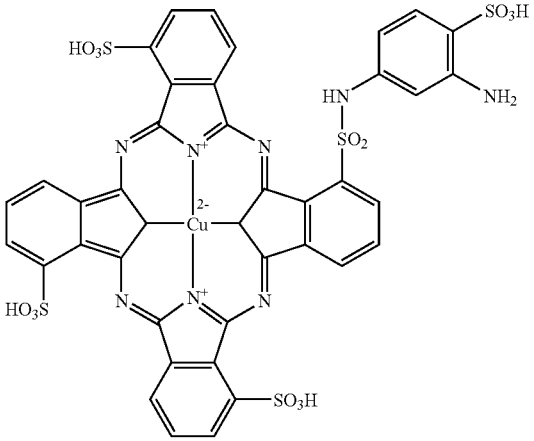 | D₁₁—NH₂ | F |
| 116 | 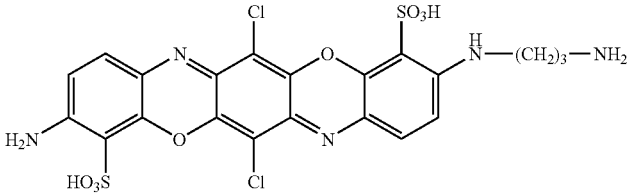 | D₁₁—NH₂ | Cl |
| 117 | 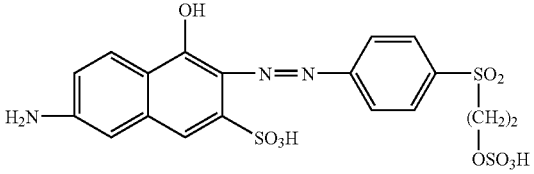 | D₁₀—NH₂ | Cl |
| 118 | 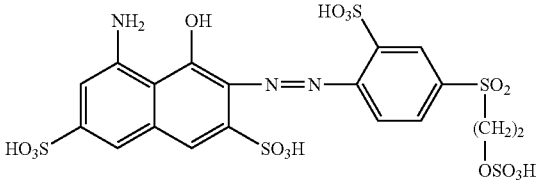 | D₁₈—NH₂ | Cl |

TABLE 3-continued
| Dye Ex. | A—NHQ₁ | Diazo component D$_{xy}$—NH₂ | X bzw. X* |
|---|---|---|---|
| 119 | 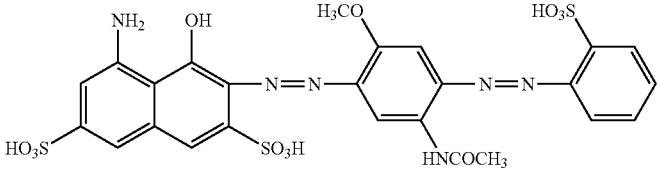 | D₁₁—NH₂ | Cl |
| 120 | 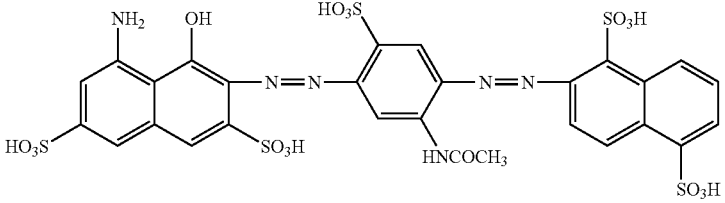 | D₁₁—NH₂ | Cl |
| 121 | 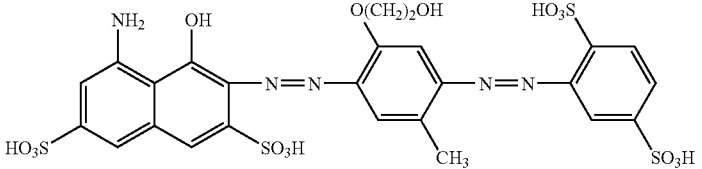 | D₁₁—NH₂ | Cl |
| 122 | 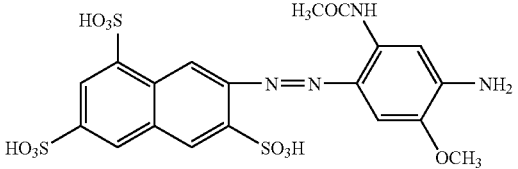 | D₁₁—NH₂ | Cl |
| 123 | 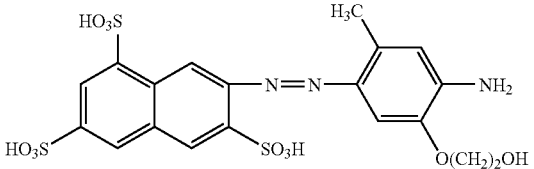 | D₁₁—NH₂ | Cl |
| 124 | 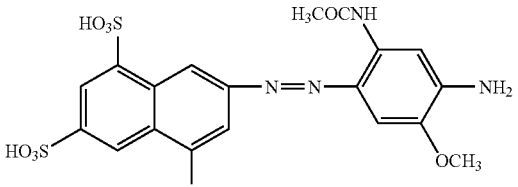 | D₁₁—NH₂ | Cl |
| 125 | 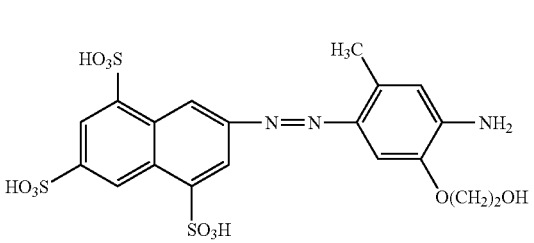 | D₁₁—NH₂ | Cl |

TABLE 3-continued

| Dye Ex. | A—NHQ₁ | Diazo component D$_{xy}$—NH₂ | X bzw. X* |
|---|---|---|---|
| 126 | HO₃S, H₂NCONH, naphthalene-azo-phenyl-NH₂ structure with SO₃H groups | D₁₁—NH₂ | Cl |
| 127 | NH₂, OH, HO₃S naphthalene-azo-phenyl structure with SO₃H groups | D₁₉—NH₂ | F |
| 128 | NH₂, OH naphthalene-azo-naphthalene structure with SO₃H groups | D₁₂—NH₂ | F |
| 129 | NH₂, OH naphthalene-azo-naphthalene structure with SO₃H groups | D₁₂—NH₂ | Cl |

Dyeing Procedure I 100 parts of cotton fabric are placed at 60° C. in 1500 parts of a dyebath containing 45 g/l of sodium chloride and 2 parts of the reactive dye obtained according to Example 33. After 45 minutes at 60° C., 20 g/l of calcined soda are added. Dyeing is continued at that temperature for a further 45 minutes. The dyed goods are then rinsed, soaped at the boil for a quarter of an hour with a non-ionic detergent, rinsed again and dried.

As an alternative to that procedure, dyeing can be carried out at 80° C. instead of at 60° C.

Dyeing Procedure II 0.1 part of the dye according to Example 33 is dissolved in 200 parts of water, and 0.5 part of sodium sulfate, 0.1 part of a levelling agent (based on the condensation product of a higher aliphatic amine and ethylene oxide) and 0.5 part of sodium acetate are added. The pH is then adjusted to a value of 5.5 with acetic acid (80%). The dyebath is heated at 50° C. for 10 minutes and then 10 parts of a woollen fabric are added. The dyebath is heated to a temperature of 100° C. in the course of about 50 minutes and dyeing is carried out at that temperature for 60 minutes. The dyebath is then cooled to 90° C. and the dyed goods are removed. The woollen fabric is washed with hot and cold water, then spun and dried.

Printing Procedure

While stirring rapidly, 3 parts of the dye obtained according to Example 33 are sprinkled into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The print paste so obtained is used to print a cotton fabric; drying is carried out and the resulting printed fabric is steamed in saturated steam at 102° C. for 2 minutes. The printed fabric is then rinsed, if desired soaped at the boil and again rinsed, and then dried.

What is claimed is:

1. A reactive dye of formula (1)

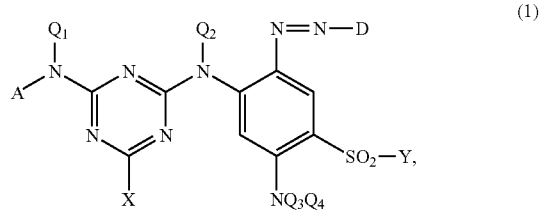

wherein $Q_1$, $Q_2$, $Q_3$ and $Q_4$ are each independently of the others hydrogen or unsubstituted or substituted $C_1$–$C_4$alkyl, A is the radical of a monoazo, polyazo, metal complex azo, anthraquinone, phthalocyanine, formazan or dioxazine chromophore, D is the radical of a diazo component, of the benzene or naphthalene series, X is halogen, 3-carboxypyridin-1-yl, 3-Carbamoylpyridin-1-yl, hydroxy, $C_1$–$C_4$alkoxy unsubstituted or substituted in the alkyl moiety, phenoxy unsubstituted or substituted in the phenyl moiety, $C_1$–$C_4$alkylthio unsubstituted or substituted in the alkyl moiety, unsubstituted or substituted amino, or an N-heterocycle which may or may not contain further hetero atoms, and Y is vinyl or a radical —$CH_2$—$CH_2$—U and U is a group removable under alkaline conditions selected from the group consisting of —Cl, —Br, —F, —$OSO_3H$, —$SSO_3H$, —OCO—$CH_3$, —$OPO_3H_2$, —OCO—$C_6H_5$, —$OSO_2$—$C_1$–$C_4$alkyl or —$OSO_2$—N($C_1$–$C_4$alkyl)$_2$.

2. A reactive dye according to claim 1, wherein $Q_1$, $Q_2$, $Q_3$ and $Q_4$ are hydrogen.

3. A reactive dye according to claim 1, wherein X is fluorine or chlorine.

4. A reactive dye according to claim 1, wherein D corresponds to a radical of formula (9) or (10)

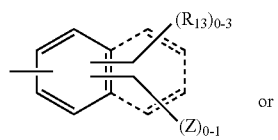

(9)

or

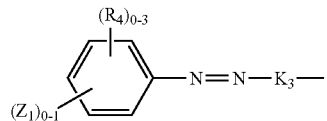

(10)

wherein $(R_4)_{0-3}$ and $(R_{13})_{0-3}$ each independently of the other denote from 0 to 3 identical or different substituents selected from the group halogen, $C_1$–$C_4$alkyl, $C_1$–$C_4$alkoxy, carboxy and sulfo, $K_3$ is the radical of a coupling component of formula (11a) or (11b)

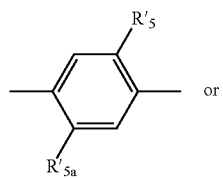

(11a)

or

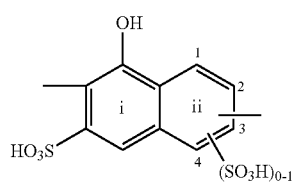

(11b)

and

Z and $Z_1$ are each independently of the other a radical of formula (2a), (2c), (2d), (2e) or (2f)

—$SO_2$—Y (2a),

—$CONR_2$—$(CH_2)_m$—$SO_2$—Y (2c),

—NH—CO—CH(Hal)—$CH_2$—Hal (2d),

—NH—CO—C(Hal)=$CH_2$ (2e) or

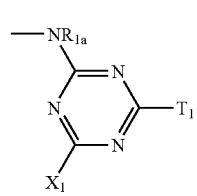

(2f)

wherein $R_{1a}$ and $R_2$ are hydrogen,

Hal is bromine,

Y is vinyl, β-chloroethyl or β-sulfatoethyl, $T_1$ is $C_1$–$C_4$alkoxy, $C_1$–$C_4$alkylthio, hydroxy, amino; N-mono- or N,N-di-$C_1$–$C_4$alkylamino unsubstituted or substituted in the alkyl moiety by hydroxy, sulfato or by sulfo; morpholino;

or phenylamino or N—$C_1$–$C_4$alkyl-N-phenylamino, wherein the alkyl is unsubstituted or substituted by hydroxy, sulfo or by sulfato, each unsubstituted or substituted in the phenyl ring by sulfo, carboxy, acetylamino, chlorine, methyl or by methoxy;

or naphthylamino unsubstituted or substituted by from 1 to 3 sulfo groups, or is a fibre-reactive radical of formula (3c') or (3d')

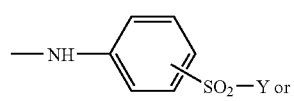

(3c')

or

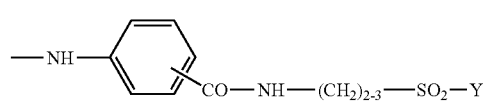

(3d')

and Y is as defined above, $X_1$ is chlorine or fluorine, m is a number 2 or 3, $R'_5$ is hydrogen, sulfo, or $C_1$–$C_4$alkoxy unsubstituted or substituted in the alkyl moiety by hydroxy or by sulfato, $R'_{5a}$ is hydrogen, $C_1$–$C_4$alkyl, $C_1$–$C_4$alkoxy, $C_2$–$C_4$alkanoylamino, ureido or a radical of formula (2f) wherein the radicals $R_{1a}$, $T_1$ and $X_1$ are as defined above.

5. A reactive dye according to claim 4, wherein the radical D corresponds to a radical of formula (9a), (9b), (9c), (9d) or (10a)

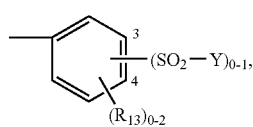

(9a)

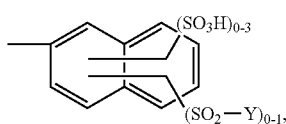

(9b)

-continued

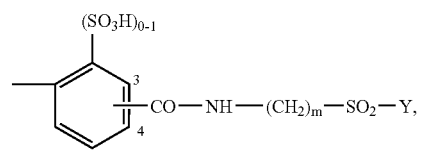
(9c)

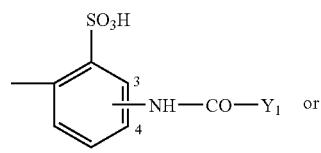
(9d)

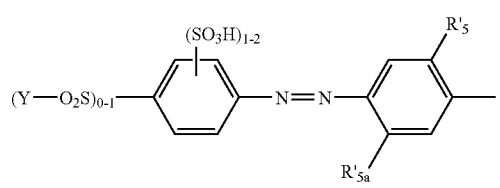
(10a)

wherein
$R'_5$ is hydrogen, sulfo, or ethoxy unsubstituted or substituted in the alkyl moiety by hydroxy or by sulfato, $R'_{5a}$ is hydrogen, methyl, ethyl, methoxy, ethoxy, acetylamino, propionylamino or ureido, $(R_{13})_{0-2}$ denotes from 0 to 2 identical or different substituents selected from the group consisting of halogen, $C_1$–$C_4$alkyl, $C_1$–$C_4$alkoxy and sulfo, $Y_1$ is a group —CH(Br)—CH$_2$—Br or —C(Br)=CH$_2$, Y is vinyl, β-chloroethyl or β-sulfatoethyl, and m is a number 2 or 3.

6. A reactive dye according to claim 1, wherein A is the radical of a mono- or dis-azo dye.

7. A reactive dye according to claim 1, wherein A is a dye radical of formula (8a), (8b), (8c), (8d), (8e), (8f), (8g), (8h), (19d) or (19e),

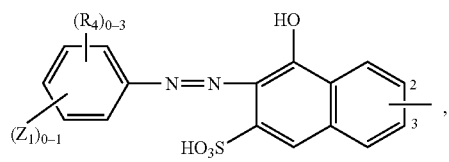
(8a)

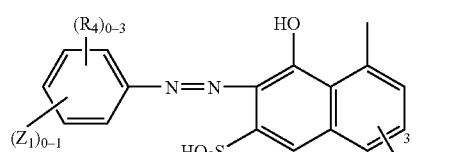
(8b)

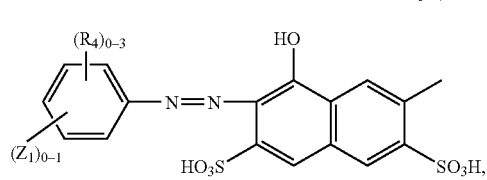
(8c)

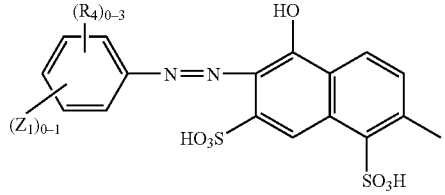
(8d)

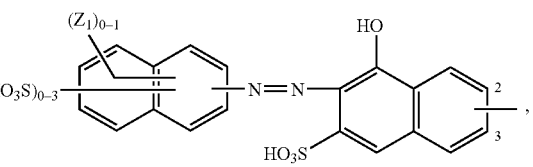
(8e)

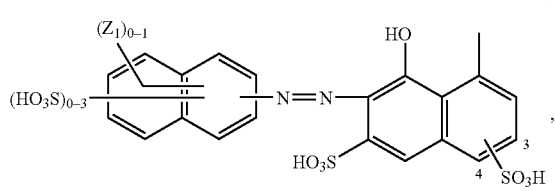
(8f)

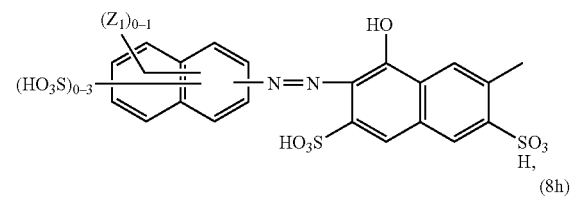
(8g)

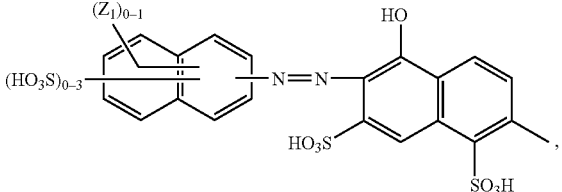
(8h)

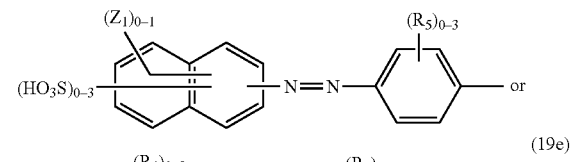
(19d)

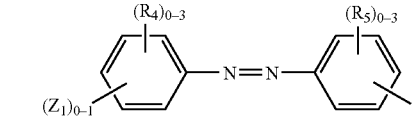
(19e)

wherein
$(R_4)_{0-3}$ denotes from 0 to 3 identical or different substituents selected from the group consisting of methyl, methoxy and sulfo, $(R_5)_{0-3}$ denotes from 0 to 3 identical or different substituents selected from the group consisting of methyl, methoxy, β-hydroxyethoxy, β-sulfatoethoxy, sulfo, acetylamino and ureido, and $Z_1$ may optionally, be a fibre-reactive radical of formula (2a)

—SO$_2$—Y     (2a)

wherein Y is vinyl or β-sulfatoethyl.

8. A reactive dye according to claim 1, wherein A is a dye radical of formula (19a), (19b), (19l) or (19n)

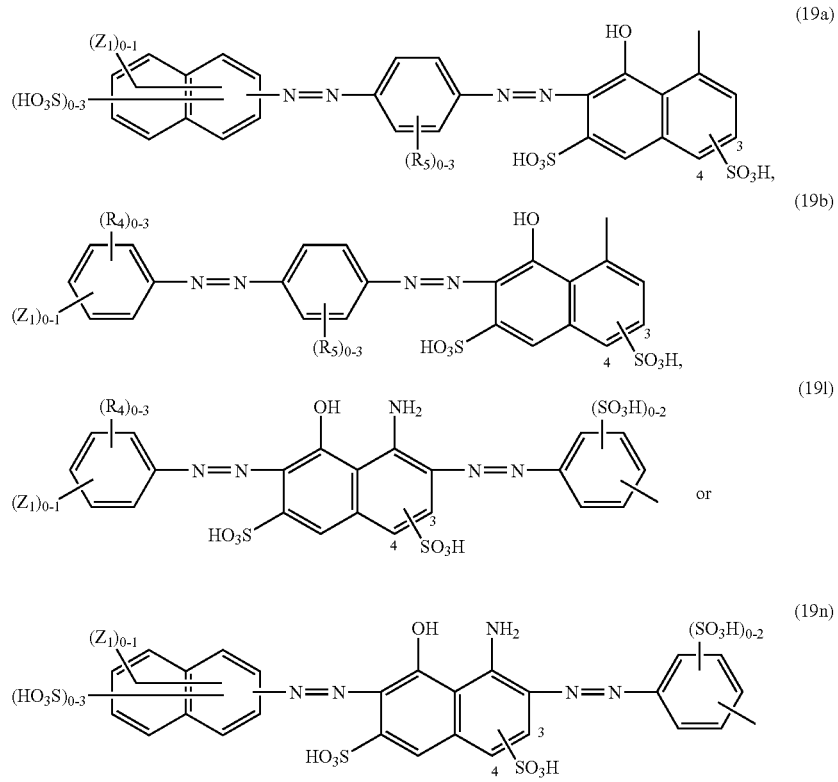

wherein
$(R_4)_{0-3}$ denotes from 0 to 3 identical or different substituents selected from the group consisting of methyl, methoxy and sulfo,
$(R_5)_{0-3}$ denotes from 0 to 3 identical or different substituents selected from the group consisting of methyl, methoxy, β-hydroxyethoxy, β-sulfatoethoxy, sulfo, acetylamino and ureido, and $Z_1$ may, optionally, be a fibre-reactive radical of formula (2a)

$$-SO_2-Y \quad (2a)$$

wherein Y is vinyl or β-sulfatoethyl.

9. A method of dyeing or printing hydroxyl-group-containing or nitrogen-containing fibre materials, which comprises contacting said materials with a tinctorially effective amount of a reactive dye according to claim 1.

10. A method according to claim 9, wherein cellulosic fibre materials, are dyed or printed.

11. A reactive dye of formula (21)

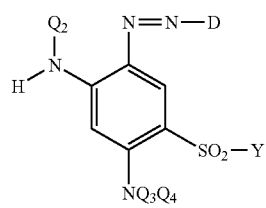

wherein
$Q_2$, $Q_3$ and $Q_4$ are each independently of the others hydrogen or unsubstituted or substituted $C_1$–$C_4$alkyl,
D is the radical of a diazo component, of the benzene or naphthalene series, and
Y is vinyl or a radical $-CH_2-CH_2-U$ and U is a group removable under alkaline conditions selected from the group consisting of $-Cl$, $-Br$, $-F$, $-OSO_3H$, $-SSO_3H$, $-OCO-CH_3$, $-OPO_3H_2$, $-OCO-C_6H_5$, $-OSO_2-C_1$–$C_4$alkyl or $-OSO_2-N(C_1$–$C_4$alkyl$)_2$.

12. A reactive dye of formula (23)

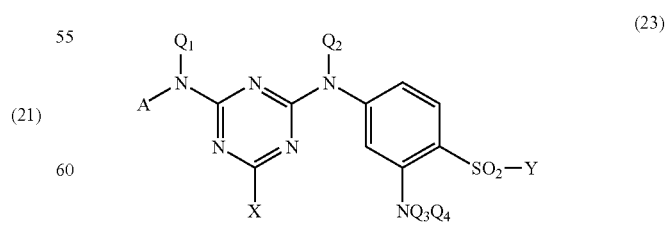

wherein
$Q_1$, $Q_2$, $Q_3$ and $Q_4$ are each independently of the others hydrogen or unsubstituted or substituted $C_1$–$C_4$alkyl, A is the radical of a monoazo, polyazo, metal complex azo, anthraquinone, phthalocyanine, formazan or dioxazine chromophore, X is halogen, 3-carboxypyridin-1-yl, 3-carbamoylpyridin-1-yl, hydroxy, $C_1$–$C_4$alkoxy unsubstituted or substituted in the alkyl moiety, phenoxy unsubstituted or substituted in the phenyl moiety, $C_1$–$C_4$alkylthio unsubstituted or substituted in the alkyl moiety, unsubstituted or substituted amino, or an N-heterocycle which may or may not contain further hetero atoms, and Y is vinyl or a radical —$CH_2$—$CH_2$—U and U is a group removable under alkaline conditions selected from the group consisting of —Cl, —Br, —F, —$OSO_3H$, —$SSO_3H$, —OCO—$CH_3$, —$OPO_3H_2$, —OCO—$C_6H_5$, —$OSO_2$—$C_1$–$C_4$alkyl or —$OSO_2$—N$(C_1$–$C_4$alkyl$)_2$.

13. A process for the preparation of a reactive dye according to claim 1, which comprises reacting one molar equivalent of 2,4,6-trichloro- or 2,4,6-trifluoro-s-triazine first with one molar equivalent of a compound of formula (20)

A-NHQ$_1$            (20), and then with one molar equivalent of a compound of formula (22)

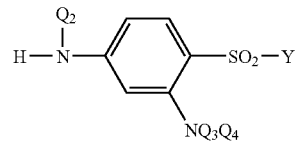
(22)

to form a compound of formula (23)

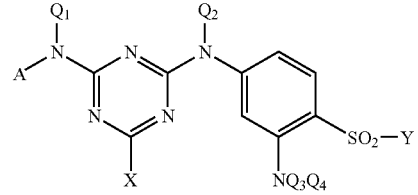
(23)

and coupling the compound of formula (23) to one molar equivalent of a conventionally diazotised compound of formula (24)

H$_2$N-D            (24)

C, $Q_1$, $Q_2$, $Q_3$, $Q_4$, A, D and Y in each case being as defined in claim 1 and X being chlorine or fluorine.

* * * * *